(12) United States Patent
Son et al.

(10) Patent No.: US 9,084,986 B2
(45) Date of Patent: Jul. 21, 2015

(54) $CO_2$ REFORMING CATALYST, METHOD OF PREPARING THE SAME, AND METHOD OF REFORMING $CO_2$

(71) Applicant: Samsung Electronics Co., Ltd., Suwon-Si, Gyeonggi-Do (KR)

(72) Inventors: In Hyuk Son, Yongin-si (KR); Seung Jae Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 13/951,634

(22) Filed: Jul. 26, 2013

(65) Prior Publication Data
US 2014/0031200 A1    Jan. 30, 2014

(30) Foreign Application Priority Data

Jul. 26, 2012 (KR) .................. 10-2012-0082013

(51) Int. Cl.
*B01J 21/00* (2006.01)
*B01J 21/04* (2006.01)
(Continued)

(52) U.S. Cl.
CPC ............... *B01J 23/755* (2013.01); *B01J 23/06* (2013.01); *B01J 23/26* (2013.01); *B01J 23/28* (2013.01); *B01J 23/34* (2013.01); *B01J 23/44* (2013.01); *B01J 23/50* (2013.01); *B01J 23/72* (2013.01); *B01J 23/75* (2013.01); *B01J 35/002* (2013.01); *B01J 35/006* (2013.01); *B01J 35/0013* (2013.01); *B01J 35/1014* (2013.01); *B01J 35/1061* (2013.01); *B01J 37/0201* (2013.01); *B01J 37/08* (2013.01); *B01J 37/18* (2013.01); *C01B 3/40* (2013.01);
(Continued)

(58) Field of Classification Search
CPC .. B01J 37/0234; B01J 37/0236; B01J 37/024; B01J 37/088; B01J 37/10; B01J 37/16; B01J 23/00; B01J 21/00
USPC ......... 502/240, 241, 243–245, 253, 255–262, 502/300–355, 439
See application file for complete search history.

(56) References Cited

U.S. PATENT DOCUMENTS 4,046,671 A * 9/1977 Burbidge et al. ............. 208/138
4,255,289 A * 3/1981 Balinsky et al. .............. 502/327
(Continued)

FOREIGN PATENT DOCUMENTS

JP        3136336 B2    2/2001
JP     2011-225431 A   11/2011
(Continued)

OTHER PUBLICATIONS

Extended European Search Report dated Nov. 6, 2013, issued in corresponding European Patent Application No. 13178251.8.

*Primary Examiner* — Cam N. Nguyen
(74) *Attorney, Agent, or Firm* — Harness, Dickey & Pierce, P.L.C.

(57) ABSTRACT

A $CO_2$ reforming catalyst may include at least one catalyst metal supported in a porous carrier. The at least one catalyst metal may include a transition metal (e.g., Ni, Co, Cr, Mn, Mo, Ag, Cu, Zn, and/or Pd). Each particle of the at least one catalyst metal may be bound with the porous carrier in a form of an alloy. The porous carrier may form a rod-shaped protruding portion around the catalyst metal particle.

7 Claims, 27 Drawing Sheets

(51) Int. Cl.

| | | |
|---|---|---|
| B01J 23/00 | (2006.01) | |
| B01J 23/02 | (2006.01) | |
| B01J 23/08 | (2006.01) | |
| B01J 23/755 | (2006.01) | |
| B01J 37/08 | (2006.01) | |
| B01J 37/18 | (2006.01) | |
| B01J 35/00 | (2006.01) | |
| B01J 35/10 | (2006.01) | |
| B01J 37/02 | (2006.01) | |
| C01B 3/40 | (2006.01) | |
| B01J 23/06 | (2006.01) | |
| B01J 23/26 | (2006.01) | |
| B01J 23/28 | (2006.01) | |
| B01J 23/34 | (2006.01) | |
| B01J 23/44 | (2006.01) | |
| B01J 23/50 | (2006.01) | |
| B01J 23/72 | (2006.01) | |
| B01J 23/75 | (2006.01) | |

(52) U.S. Cl.
CPC .............. *C01B 2203/0238* (2013.01); *C01B 2203/1041* (2013.01); *C01B 2203/1052* (2013.01); *C01B 2203/1058* (2013.01); *C01B 2203/1064* (2013.01); *C01B 2203/1076* (2013.01); *C01B 2203/1082* (2013.01); *C01B 2203/1241* (2013.01)

(56) References Cited

U.S. PATENT DOCUMENTS

| | | | | |
|---|---|---|---|---|
| 4,952,543 | A * | 8/1990 | Huang et al. | 502/35 |
| 5,106,800 | A * | 4/1992 | Moser et al. | 502/53 |
| 5,716,515 | A * | 2/1998 | Innes | 208/137 |
| 6,291,384 | B1 * | 9/2001 | Mink et al. | 502/107 |
| 6,294,492 | B1 * | 9/2001 | Lin | 502/35 |
| 6,472,340 | B2 * | 10/2002 | Lin | 502/34 |
| 7,390,770 | B2 * | 6/2008 | Nochi et al. | 502/327 |
| 2001/0054573 | A1 * | 12/2001 | Macahan et al. | 208/140 |
| 2002/0002111 | A1 * | 1/2002 | Lin | 502/339 |
| 2003/0103893 | A1 | 6/2003 | de Lasa et al. | |
| 2005/0070740 | A1 | 3/2005 | Rode et al. | |
| 2005/0209098 | A1 | 9/2005 | Gulla et al. | |
| 2007/0179043 | A1 * | 8/2007 | Kojima | 502/60 |
| 2011/0046419 | A1 | 2/2011 | Zhang et al. | |
| 2011/0121238 | A1 * | 5/2011 | Wakatsuki | 252/373 |
| 2011/0245071 | A1 | 10/2011 | Tanabe | |
| 2012/0184430 | A1 | 7/2012 | Lee et al. | |
| 2012/0237432 | A1 | 9/2012 | Son et al. | |

FOREIGN PATENT DOCUMENTS

| | | |
|---|---|---|
| KR | 20020041346 A | 6/2002 |
| KR | 20100044468 A | 4/2010 |
| KR | 2012-0037821 A | 4/2012 |
| WO | WO-2011/106876 A1 | 9/2011 |

* cited by examiner

CO₂ REFORMING CATALYST, METHOD OF PREPARING THE SAME, AND METHOD OF REFORMING CO₂

CROSS-REFERENCE TO RELATED APPLICATION

This application claims priority under 35 U.S.C. §119 to Korean Patent Application No. 10-2012-0082013, filed in the Korean Intellectual Property Office on Jul. 26, 2012, the entire contents of which are incorporated herein by reference.

BACKGROUND

1. Field

The present disclosure relates to $CO_2$ reforming catalysts, methods of preparing the same, and methods of reforming $CO_2$ using the same.

2. Description of the Related Art

Decreasing the generation of carbon dioxide, the leading greenhouse gas, has become a globally important matter. In addition to the demand for a $CO_2$ decrease due to $CO_2$ discharge regulations, studies on converting $CO_2$ to a specific chemical material to create added value are progressing. Since a method of converting $CO_2$ into $H_2$ and CO (which are used as precursors of chemical materials) using a relatively high temperature dry catalyst reaction of $CO_2$ and $CH_4$ may mitigate $CO_2$ accumulation and recycle $CO_2$ as a useful chemical material, it has been steadily studied in chemical factories and oil refineries where a relatively large amount of $CO_2$ is generated.

However, in the case of a catalyst used in converting $CO_2$, the catalyst may become degraded by the sintering of the catalyst particles during a relatively high temperature reaction, wherein carbon is deposited on the surfaces of the catalyst particles.

SUMMARY

Some example embodiments relate to a relatively thermally stable and inexpensive $CO_2$ reforming catalyst which compensates coking deposition during a $CO_2$ reforming reaction to reduce degradation and that has a desirable level of activity.

Some example embodiments relate to a method of preparing a relatively thermally stable and inexpensive $CO_2$ reforming catalyst which compensates the coking deposition during the $CO_2$ reforming reaction to reduce the degradation and has a desirable level of activity.

Some example embodiments relate to a method of reforming $CO_2$ by using a relatively thermally stable and inexpensive $CO_2$ reforming catalyst which compensates the coking deposition during the $CO_2$ reforming reaction to reduce the degradation and has a desirable level of activity.

According to one example embodiment, a $CO_2$ reforming catalyst may include a porous carrier including a framework and protruding portions defining a plurality of pores therein. At least one catalyst metal particle may be disposed within the plurality of pores of the porous carrier. The at least one catalyst metal particle may include a transition metal. The transition metal may be a Group 6-12 element. The Group 6-12 element may be selected from the group consisting of Ni, Co, Cr, Mn, Mo, Ag, Cu, Zn, and Pd. The at least one catalyst metal particle is chemically bound to the porous carrier (e.g., in a form of an alloy). In a non-limiting embodiment, the catalyst metal particle has a half circular or half oval-shaped cross-sectional surface when linearly cut in a direction perpendicular to the binding surface of the catalyst metal particle and the porous carrier. The at least one catalyst metal particle may also have a deformed surface that conforms to a receiving surface of the porous carrier. Furthermore, the porous carrier may include a protruding portion extended in a rod, needle, or sheet shape around the catalyst metal particle.

The porous carrier may be an oxide. For instance, the oxide may be at least one selected from the group consisting of alumina, titania, ceria, and silica oxide.

The $CO_2$ reforming catalyst may be participated in a $CO_2$ reforming reaction represented by the following Reaction Scheme 5.

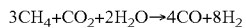  [Reaction Scheme 5]

After using the $CO_2$ reforming catalyst as a catalyst in the $CO_2$ reforming reaction represented by Reaction Scheme 5 at about 700 to about 900° C., for example, at about 850° C., for about 10 to about 200 hours, the particle diameter change of the catalyst metal particle in random directions may have a growth rate of about 5 to about 10% compared to before using the catalyst.

In the $CO_2$ reforming catalyst, the longest diameter of catalyst metal particles before being used for the $CO_2$ reforming reaction may have an average ranging from about 2 to about 20 nm.

The $CO_2$ reforming reaction may be performed while including water.

The porous carrier may have a specific surface area of about 20 to about 500 m²/g.

The catalyst metal may have a supported concentration of about 1 to about 15 wt %.

According to another embodiment, a method of preparing a $CO_2$ reforming catalyst may include the following steps:

immersing a porous carrier in a precursor solution of at least one catalyst metal (e.g., selected from the group consisting of Ni, Co, Cr, Mn, Mo, Ag, Cu, Zn, and Pd) and drying the same to provide a catalyst-carrier complex in which the catalyst metal particles are supported in the porous carrier;

firing the catalyst-carrier complex at a temperature of less than or equal to about 900° C. under presence of nitrogen ($N_2$) or hydrogen ($H_2$) gas;

purging the fired catalyst-carrier complex with inert gas and reducing the same;

immersing the reduced catalyst-carrier complex in water; and reducing the catalyst-carrier complex.

The $CO_2$ reforming catalyst prepared according to the method has a half circular or half oval shaped cross-sectional surface when linearly cut in a direction perpendicular to the binding surface of the catalyst metal particle and the porous carrier as each catalyst metal particle binds to the porous carrier in a form of an alloy, and wherein the porous carrier includes a protruding portion extended in a rod, needle, or sheet shape around the catalyst metal particle.

According to another embodiment, a $CO_2$ reforming method converting reactants of methane, $CO_2$, and water into CO and $H_2$ according to the reaction represented by the following Reaction Scheme 5 is provided that includes using a $CO_2$ reforming catalyst in which at least one catalyst metal selected from the group consisting of Ni, Co, Cr, Mn, Mo, Ag, Cu, Zn, and Pd is supported in a porous carrier, wherein the catalyst metal particle has a half circular or half oval-shaped cross-sectional surface when linearly cut in a direction perpendicular to the binding surface of the catalyst metal particle and the porous carrier by binding each catalyst metal particle to the porous carrier in a form of an alloy, and wherein the porous carrier includes a protruding portion extended in a rod, needle, or sheet shape around the catalyst metal particle.

$$3CH_4 + CO_2 + 2H_2O \rightarrow 4CO + 8H_2 \qquad \text{[Reaction Scheme 5]}$$

The $CO_2$ reforming method using the $CO_2$ reforming catalyst is a wet $CO_2$ reforming reaction that includes water in addition to raw materials for reforming $CO_2$ such as $CO_2$ and $CH_4$.

The $CO_2$ wet reforming reaction represented by Reaction Scheme 5 may include a method of producing graphene on the surface of the catalyst metal particle of the $CO_2$ reforming catalyst as a side product as well as products of CO and $H_2$. Graphene may be formed in 1-5 layers on the surface of the catalyst metal particle. The reaction for producing graphene from the reactants of $CH_4$ and $CO_2$ may be represented by the following Reaction Scheme 6 and Reaction Scheme 7.

$$CH_4 \leftrightarrow 2H_2 + C \qquad \text{[Reaction Scheme 6]}$$

$$2CO \leftrightarrow CO_2 + C \qquad \text{[Reaction Scheme 7]}$$

DETAILED DESCRIPTION

Figure 1:
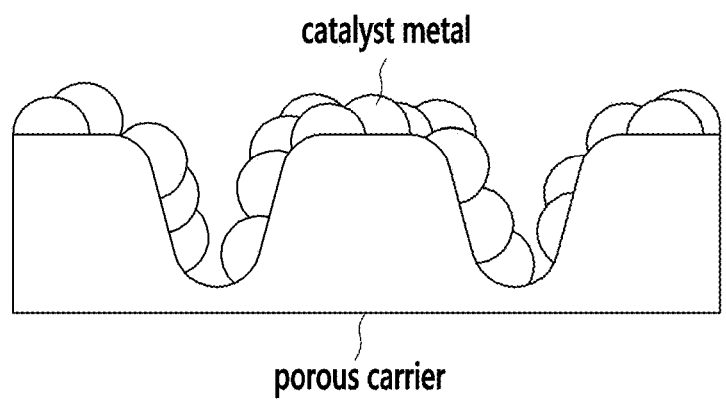
FIG. 1 is a schematic view showing the cross-sectional surface where a Ni particle is supported in alumina in a form of an alloy in the $CO_2$ reforming catalyst including a catalyst metal of Ni and a porous carrier of alumina.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

According to one example embodiment, a $CO_2$ reforming catalyst is formed by supporting at least one catalyst metal in a porous carrier. The catalyst metal may be in the form of a particle that includes a transition metal. For instance, the transition metal maybe a Group 6-12 element. The Group 6-12 element may be selected from the group consisting of Ni, Co, Cr, Mn, Mo, Ag, Cu, Zn, and Pd, although example embodiments are not limited thereto. The catalyst metal particle may have a half circular-shaped or half oval-shaped cross-sectional surface when linearly cut in a vertical direction to the binding surface of the catalyst metal particle and the porous carrier, although it should be understood that variations in shape are possible. Each catalyst metal particle is chemically bound to the porous carrier (e.g., in a form of an alloy). In addition, the porous carrier includes a protruding portion that extends in a rod, needle, or sheet shape around the catalyst metal particle. The extended protruding portions of the porous carrier and the catalyst metal particle form a strong interaction with each other.

The catalyst metal particles may have an average size ranging from about 1 nm to about 50 nm. The pores of the porous carrier may have an average size of about 1 μm or more. In a non-limiting embodiment a ratio of the average pore size to the average particle size may range from about 20 to about 1000.

According to another example embodiment, the $CO_2$ reforming catalyst may be prepared by the following method of preparing a $CO_2$ reforming catalyst. The prepared catalyst may considerably reduce or prevent the decrease of an active part of the catalyst caused by sintering a catalyst metal at a relatively high temperature and the degradation of a catalyst caused by carbon deposition (which are problems in the conventional $CO_2$ reforming catalyst).

The $CO_2$ reforming catalyst may be used as a catalyst for a $CO_2$ reforming reaction. The $CO_2$ reforming reaction may be expressed by generating $H_2$ and CO from a dry catalyst reaction of $CO_2$ and $CH_4$ at a relatively high temperature, and the reaction mechanism is a strong endothermic reaction as represented in following Reaction Scheme 1 and Reaction Scheme 2. Accordingly, the reaction may be performed at a temperature of greater than or equal to 650° C., but it may be beneficial to keep the temperature to less than or equal to 850° C. for efficiency reasons. When using the catalyst according to one example embodiment, the activity is enhanced at a temperature of 700 to 850° C. compared to the conventional catalyst, so as to expect a catalyst having higher efficiency.

$CH_4 + CO_2 \rightarrow 2CO + 2H_2 \Delta Ho = 247.3$ kJ/mol [Reaction Scheme 1]

$CO_2 + H_2 \rightarrow CO + 2H_2O \Delta Ho = 41$ kJ/mol [Reaction Scheme 2]

The problems in the reaction are the methane decomposition reaction ($CH_4$ cracking) represented by the following Reaction Scheme 3 and the catalyst performance degradation by catalyst coking which is generated by depositing carbon on the catalyst surface according to the Boudouard reaction represented by the following Reaction Scheme 4, as well as the above reaction. The methane decomposition reaction ($CH_4$ cracking) represented by the following Reaction Scheme 3 becomes the main cause for deactivating the catalyst, and the Boudouard reaction represented by the following Reaction Scheme 4 is relatively less serious at a high temperature.

$CH_4 \leftrightarrow C + 2H_2 \Delta Ho = 122.3$ kJ/mol [Reaction Scheme 3]

$2CO \leftrightarrow C + CO_2 \Delta Ho = 125.2$ kJ/mol [Reaction Scheme 4]

Carbon produced from the reaction deactivates the catalyst by decreasing the reaction surface area of the catalyst, blocking pores, and accelerating the decomposition of the supporter.

In addition, the sintering phenomenon of decreasing the active portions of the catalyst during a relatively high temperature catalyst reaction is also a serious factor for degrading a catalyst. The sintering indicates the phenomenon in which catalysts are coagulated with each other and grown into larger particles due to the lack of thermal stability when the chemical reaction using a catalyst is carried out at a relatively high temperature. The pores of the carrier are decreased by the sintering phenomenon, and the interface area of the catalyst/carrier is also decreased. Since the catalyst reaction is considered to be performed at the interface between the catalyst and carrier, the active surface area of catalyst is decreased and the reaction gas is hardly diffused into the active portions of the catalyst when the interface area of the catalyst/carrier is decreased, and thus the binding force of catalyst/carrier is also decreased by narrowing the interface between the carrier and catalyst. As the result of this phenomenon, the conversion rate of reaction gas is decreased in the reaction, the internal pressure of the reactor is increased, and the durability of the catalyst and carrier is deteriorated.

The $CO_2$ reforming catalyst according to one example embodiment is stabilized even at a relatively high temperature by the strong interaction bond of the catalyst-carrier, and thus the size of the catalyst metal particle is less changed even after participating in a $CO_2$ reforming reaction at a relatively high temperature to remarkably decrease the coking due to Reaction Scheme 3 and Reaction Scheme 4. Accordingly, the carbon amount deposited on the surface of the catalyst particle is remarkably decreased, or the produced carbon is easily removed, and thus the life-span and durability of the catalyst are improved.

In addition, the $CO_2$ reforming catalyst ensures thermal stability, so the sintering phenomenon of decreasing active portions of the catalyst is remarkably decreased during a relatively high temperature catalyst reaction.

Studies using an inexpensive catalyst of Ni have been conducted for the high temperature dry catalyst reaction of $CO_2$ and $CH_4$. A Ni catalyst has a benefit of price competitiveness compared to a noble metal catalyst, and also dissociates $CO_2$ and $CH_4$ at a relatively low temperature due to its relatively strong absorption with carbon. Therefore, a Ni catalyst is mainly used in the reaction.

Since Ni causes degradation due to coking when having a catalyst particle size of greater than or equal to about 5 nm, the coking is progressed by sintering the catalyst particle at a high temperature reaction when the catalyst is used at the optimal catalyst supported amount (about 5 to 8 wt %). Accordingly, when the prepared catalyst is thermally stabilized, the coking is reduced to provide a further stable catalyst.

When the $CO_2$ reforming catalyst is prepared by supporting a catalyst metal such as Ni or the like in a porous carrier according to the conventional method of a wet process, immersing, co-precipitation, electro-plating, thermal evaporation, e-beam evaporation, or sputtering, the catalyst metal particle in the prepared catalyst forms an amorphous sphere, and the particles are physically bound to the surface of the porous carrier. In this case, the interaction between the catalyst metal particle and the porous carrier is very weak. In addition, the catalyst has a smaller catalyst/carrier interface area between the catalyst and porous carrier.

Figure 2:
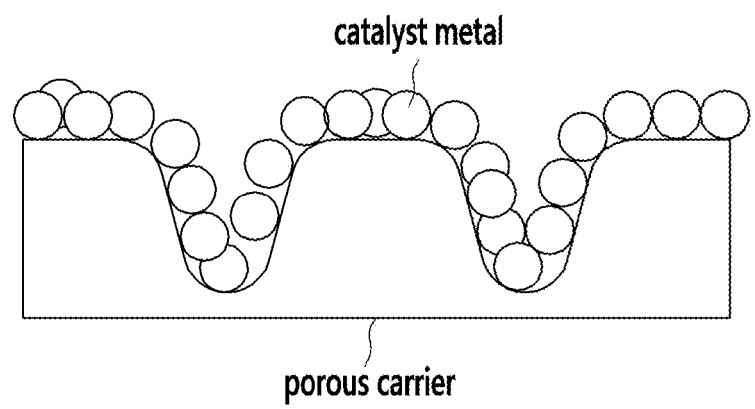
FIG. 2 is a schematic view showing the cross-sectional surface where a Ni particle is supported in alumina in the nickel-alumina (NiAl) catalyst prepared according to a conventional wet process.

FIG. 2 shows a cross-sectional view exaggerating the binding shape of the catalyst metal particle to the porous carrier in the conventional $CO_2$ reforming catalyst. As shown in FIG. 2, in the conventional catalyst, catalyst metal particles are formed in a spherical shape and are weakly bound with the surface of an alumina carrier.

On the other hand, according to the $CO_2$ reforming catalyst of one example embodiment, the catalyst metal particle is chemically bound with the porous carrier (e.g., in a form of an alloy) on the porous carrier. What is meant by the catalyst metal particle being bound with the porous carrier in a form of an alloy is that each catalyst metal particle forms an atomic bond with the porous carrier. Assuming a nickel catalyst metal particle and an alumina porous carrier, the atomic bonds may include Ni—Al and Ni—O—Al bonds. As a result, the catalyst metal particle will have a half circular or half oval cross-sectional surface when linearly cut in the direction perpendicular to the binding surface with the porous carrier. The catalyst metal particle is attached to the porous carrier by the strong interaction between the catalyst metal particle and the porous carrier as exaggeratingly shown in FIG. 1. In a non-limiting embodiment, the catalyst metal may cover about 10% to about 100% of the surface of the porous carrier. For instance, at 100%, it should be understood that the catalyst metal covers the entire surface of the porous carrier.

As shown in FIG. 1, when each catalyst metal particle is bound to the surface of the porous carrier in a form of an alloy, the carrier/catalyst interface is further widened compared to the conventional catalyst shown in FIG. 2. The binding force of the carrier/catalyst is enhanced by increasing the interface area of the carrier/catalyst. For example, about 10% to about 50% of the surface area of the catalyst metal particle may interface with the porous carrier. In a non-limiting embodiment, about 10% to about 33% of the surface area of the catalyst metal particle may interface with the porous carrier. Where the catalyst metal particle is a hemispherical structure, about 33% of the surface area of the catalyst metal particle may interface with the porous carrier ($\pi r^2/[2\pi r^2 + \pi r^2]$). As a result of the increased interfacial binding area, the prepared catalyst is more stable at a relatively high temperature so as to reduce or prevent the sintering of the catalyst metal particle.

Figure 3:
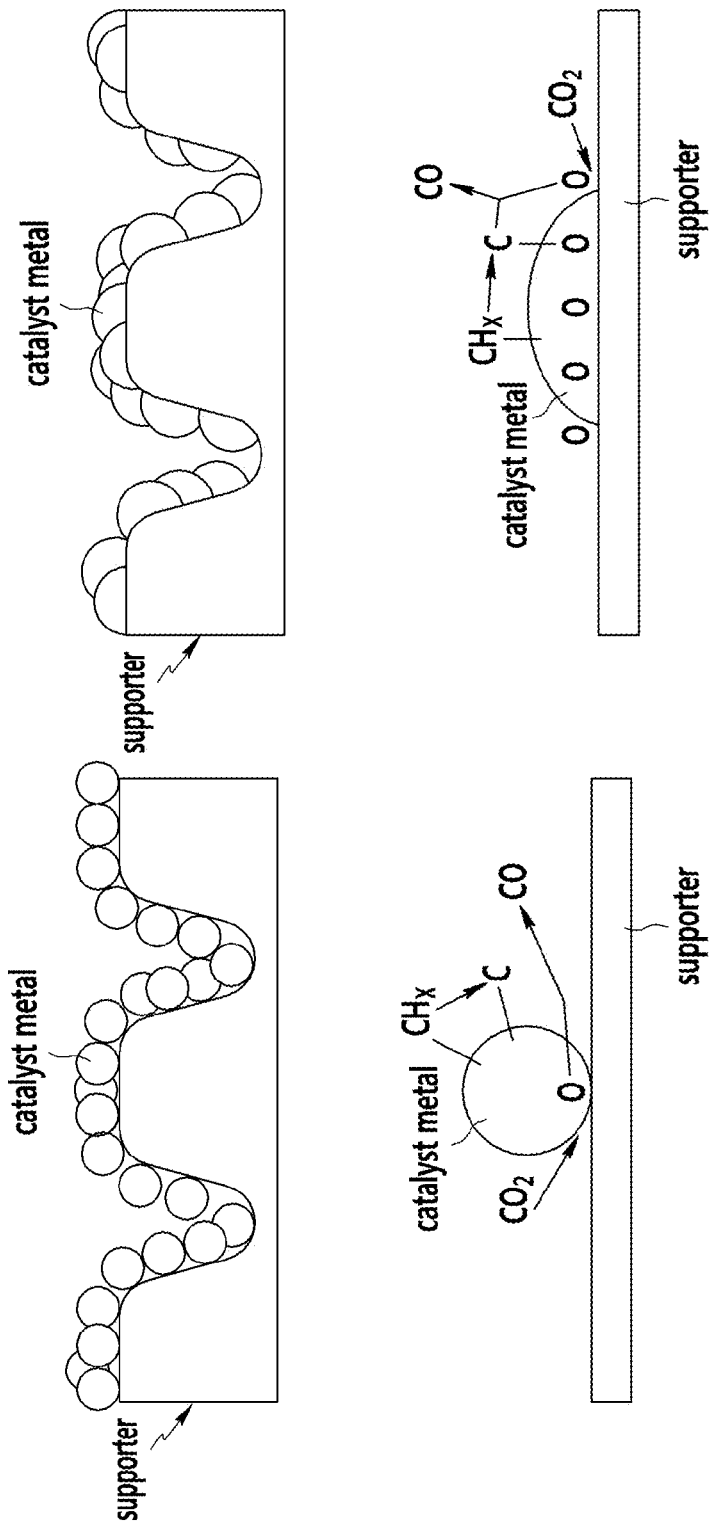
FIG. 3 is a schematic view showing an efficiency difference of a $CO_2$ reforming reaction depending upon the binding shape between a catalyst/carrier in a NiAl catalyst prepared according to a conventional wet process (left) and a NiAl catalyst prepared according to one example embodiment of the present disclosure (right).

In addition, when widening the interface area of the carrier/catalyst, the efficiency of the $CO_2$ reforming reaction is further increased on the interface thereof. FIG. 3 schematically shows the mechanism. As shown in FIG. 3, the $CO_2$ reforming catalyst according to one example embodiment may more effectively perform the $CO_2$ reforming reaction through the widened carrier/catalyst interface and may also further reduce the coking and degradation phenomenon of the catalyst caused by depositing carbon on the surface of the catalyst particle (which is a side reaction). As shown in the left side of FIG. 3, in the conventional Ni-alumina catalyst, Ni particles are formed in a spherical shape, so the interface area between the catalyst/carrier is significantly lower than the interface area between the catalyst/carrier according to one example embodiment shown in the right side of FIG. 3. As a result, the efficiency of the $CO_2$ reforming reaction for the conventional catalyst is also lower and the carbon deposition phenomenon due to the side-reaction is also higher, which causes further deterioration.

Figure 4A:
FIG. 4 shows SEM (scanning electron microscope) (FIG. 4A) and TEM (transmission electron microscope) (FIG. 4B) photographs of the catalyst according to Example 1.
Figure 4B:
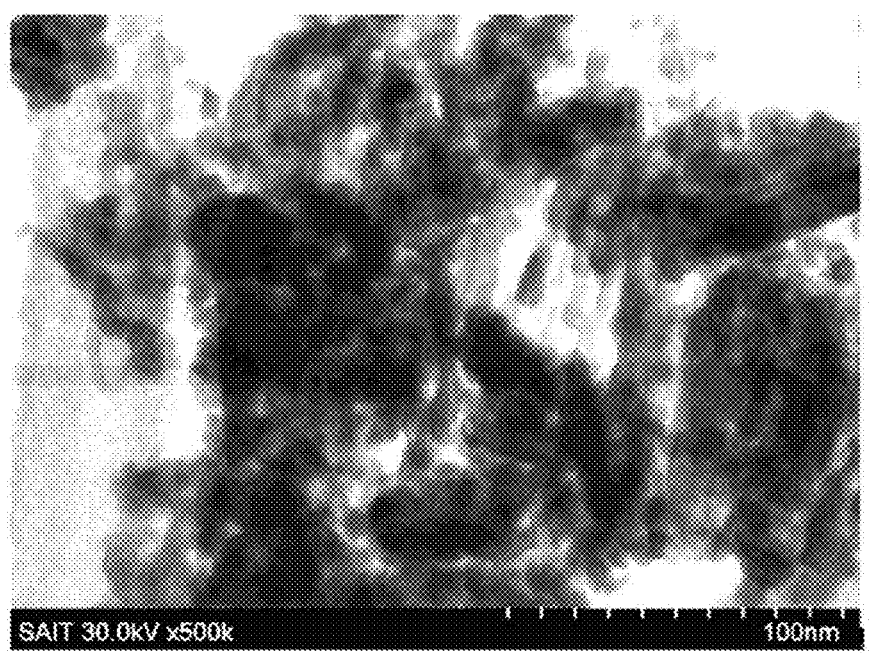
Figure 5A:
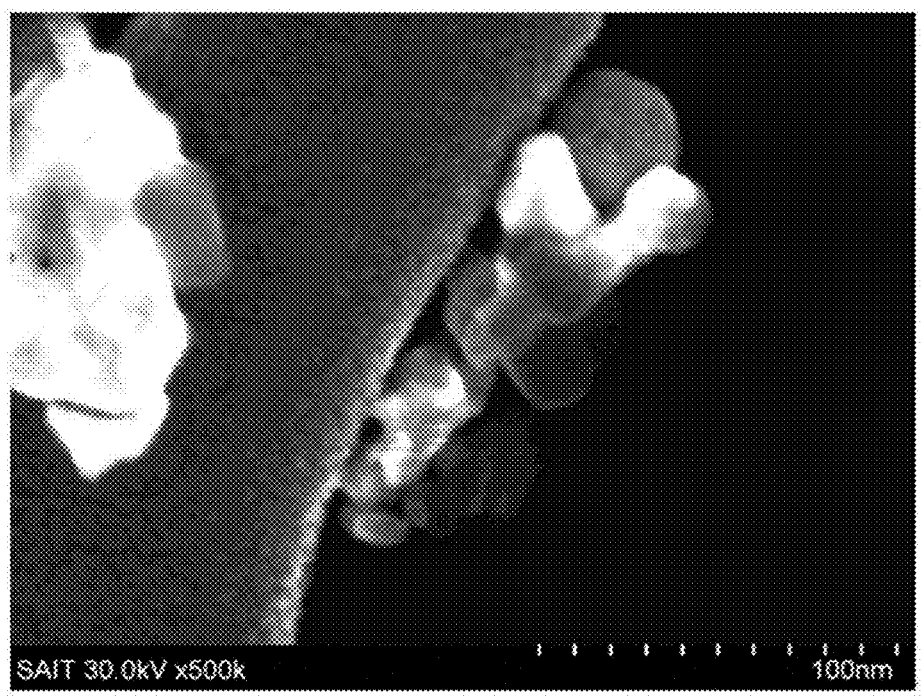
FIG. 5 shows SEM (FIG. 5A) and TEM (FIG. 5B) photographs enlarging a part of a Ni particle and an alumina rod in a different magnification from the catalyst photographs shown in FIG. 4.
Figure 5B:
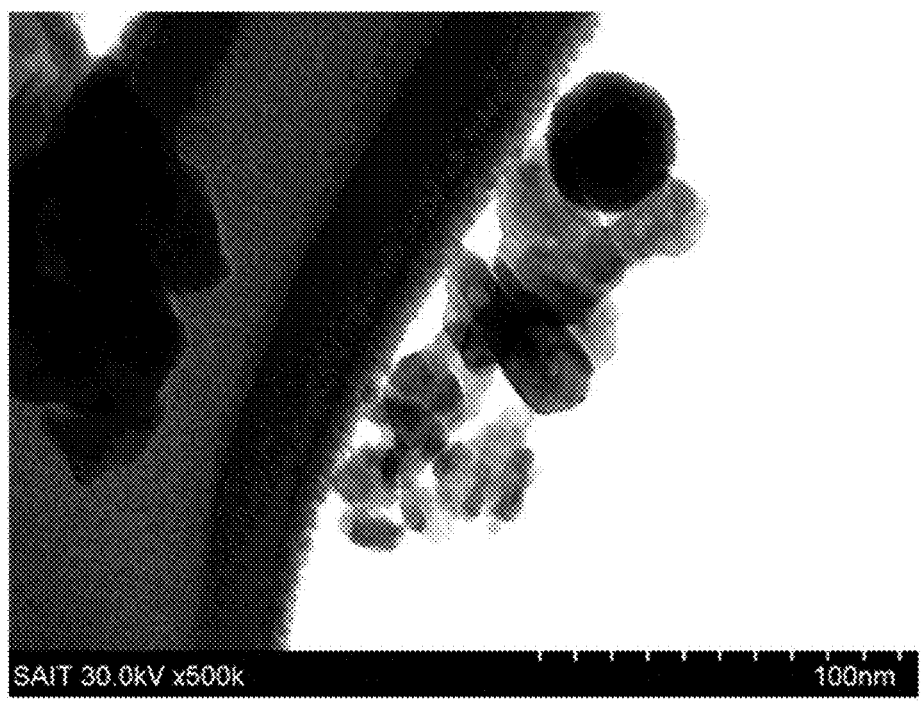

In the catalyst according to an example embodiment, when a porous carrier includes, for example, an alumina carrier, the carrier includes a protruding portion extended in a rod, needle, or sheet shape around the catalyst metal particle. This is shown in FIG. 4. FIG. 4 shows SEM (scanning electron microscope) and TEM (transmission electron microscope) photographs of the $CO_2$ reforming catalyst according to one example embodiment including a catalyst metal of Ni and a porous carrier of alumina. FIG. 4A shows rod protruding portions formed by alumina. The rod-shaped protruding portion is formed by surrounding the catalyst metal particle bound with the alumina carrier, which is shown in detail in FIG. 4B. FIG. 4B shows hexagonal particles among rod-shaped carrier protruding portions, which are Ni catalyst particles. FIG. 5A and FIG. 5B are SEM (FIG. 5A) and TEM (FIG. 5B) photographs enlarging a part of the catalyst shown in FIG. 4 by differing the magnification. FIGS. 5A and 5B may show the further detailed shapes and binding relationship of the catalyst metal particle and the porous carrier of the $CO_2$ reforming catalyst according to one example embodiment.

Figure 6A:
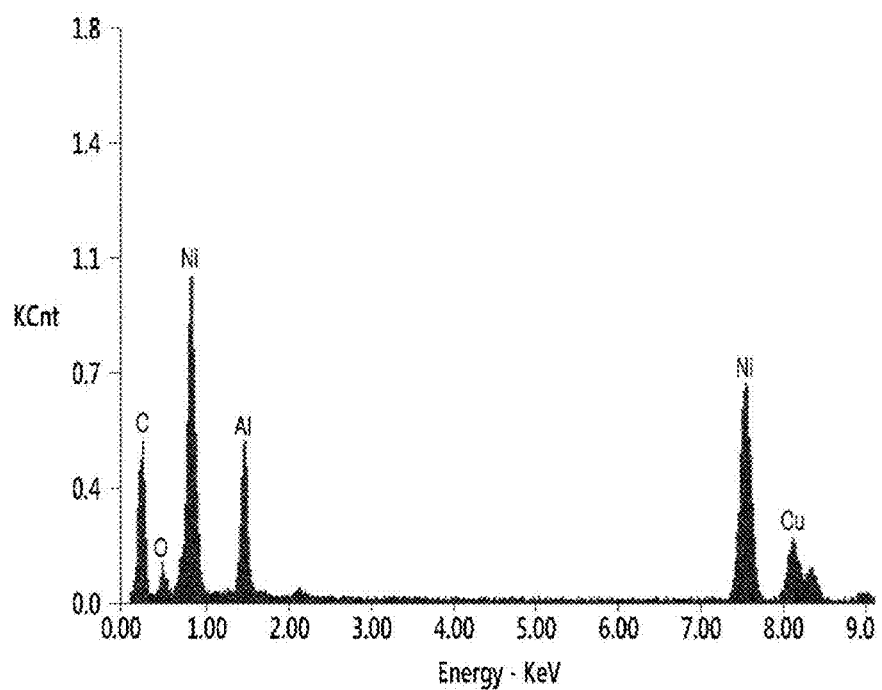
FIG. 6 shows graphs of measuring components of the catalyst particle portion (FIG. 6A) and the rod-shaped protruding portion (FIG. 6B) by EDAX in the catalyst according to Example 1.
Figure 6B:
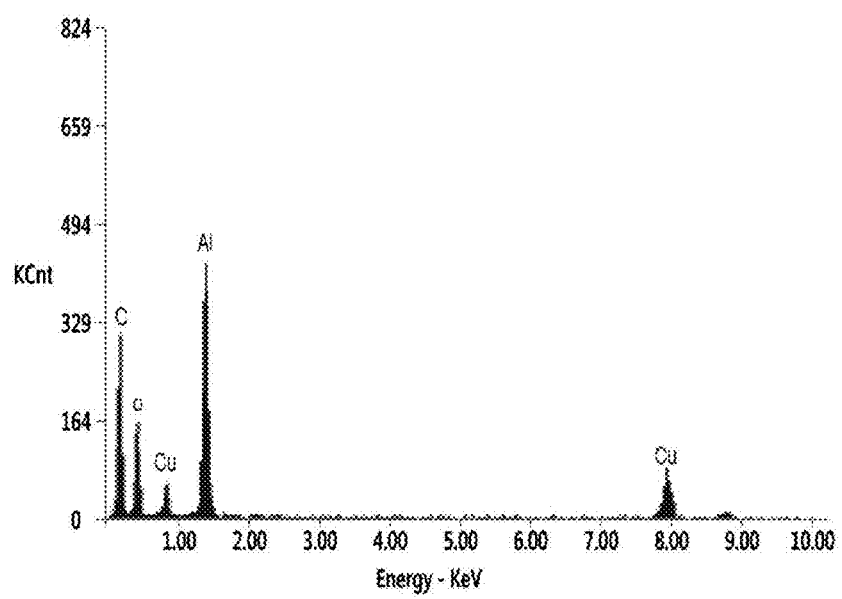

FIG. 6 is a graph showing the components of a particle portion (FIG. 6A) and the other portions (FIG. 6B) in a Ni-alumina catalyst according to one example embodiment measured by an EDAX (Energy Dispersive x-ray Spectroscopy) element analyzer.

FIG. 6A shows the results of measuring components of a portion expressed in a hexagon particle in the catalyst shown in FIG. 4 or FIG. 5. It is understood that the hexagon particle is a Ni metal particle since Ni is mostly included. FIG. 6B shows the results of measuring the rod-shaped protruding portion in the catalyst, and it is understood that aluminum (Al) is most detected, so the protruding portion is derived from the carrier. In other words, it is understood that the hexagon particles expressed in TEM photographs or the like of FIG. 4 and FIG. 5 are Ni catalyst particles, and the rod-shaped protruding portions are derived from the carrier.

As shown in the SEM photograph and TEM photograph for the surface of the Ni-alumina catalyst prepared by the conventional general method in FIG. 7, it is understood that the catalyst does not include extending rod-shaped protruding portions of alumina, differing from one example embodiment of the present disclosure.

In the $CO_2$ reforming catalyst according to one example embodiment, the catalyst metal particle is bound with the surface of the carrier in a form of an alloy, and simultaneously, the carrier forms a rod, needle, or sheet-shaped protruding portion around the catalyst metal particle, so a relatively strong interaction between the catalyst metal particle and the carrier is provided. Therefore, the bond between the catalyst-carrier is further stabilized to reduce or prevent the sintering between the catalyst metal particles and to decrease the carbon deposition on the surface of the catalyst particle even after being used in the $CO_2$ reforming reaction represented by Reaction Scheme 5 at a relatively high temperature for a long time, for example, at about 700 to about 900° C. for about 10 hours to about 200 hours, and specifically, at about 700 to about 850° C. for about 10 hours to about 200 hours. Accordingly, the size of the catalyst particle after being used in the $CO_2$ reforming reaction has a growth rate of only about 5 to about 10% relative to the size of the catalyst particle before being used in the reaction. In other words, the catalyst may reduce or prevent the catalyst degradation and maintain the catalyst activity even when being used at a relatively high temperature for a relatively long time, so the life-span of the catalyst may be significantly prolonged.

The $CO_2$ reforming catalyst according to one example embodiment may have a relatively uniform diameter average of the catalyst metal particles before being used in the $CO_2$ reforming reaction within the range of about 2 to about 20 nm, specifically, about 10 to about 20 nm, as understood from FIG. 4 and FIG. 5. The growth rate of the catalyst particle before and after the reaction is also within a range of about 5 to about 10%. The size of the catalyst metal particle is insignificantly changed even after the catalyst reaction at a relatively high temperature (850° C.). Considering that the catalyst particle is more sintered at a relatively high temperature reaction when having the greater diameter of the catalyst particle, the catalyst particle size of the catalyst according to one example embodiment may be effective in reducing or preventing the sintering and maintaining the catalyst active specific surface area to improve the activity of the catalyst.

In addition, it is understood that in the catalyst according to one example embodiment, the average length of the rod-shaped protruding portion of the porous carrier is maintained between about 10 and about 20 nm as shown in FIG. 4 and FIG. 5.

Figure 8A:
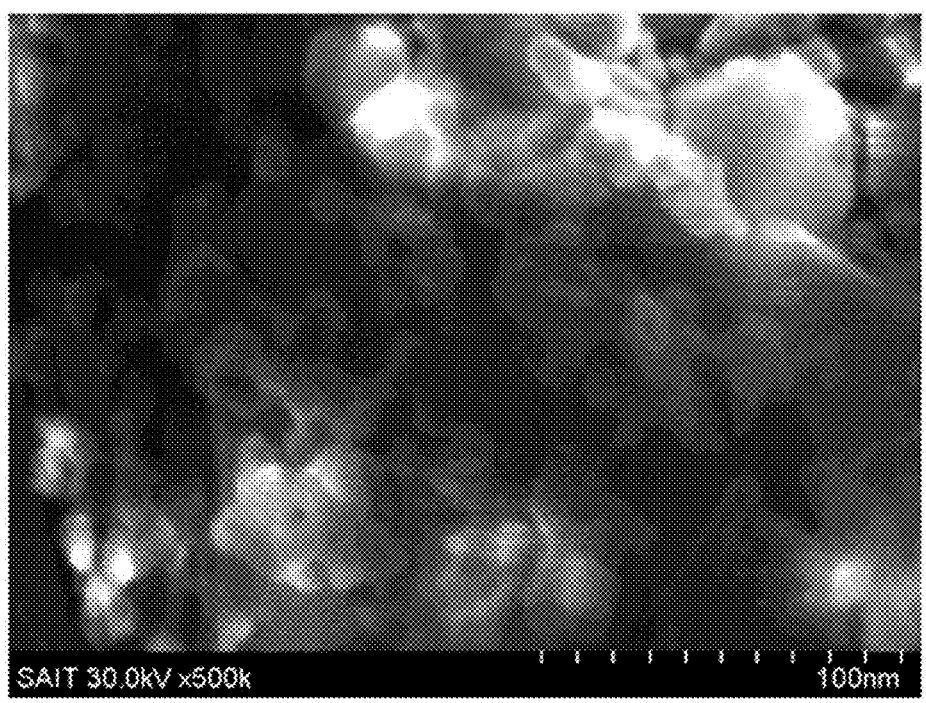
FIG. 8 shows SEM (FIG. 8A) and TEM (FIG. 8B) photographs of the catalyst according to Example 1 after performing a dry $CO_2$ reforming reaction using the catalyst for 200 hours.
Figure 8B:
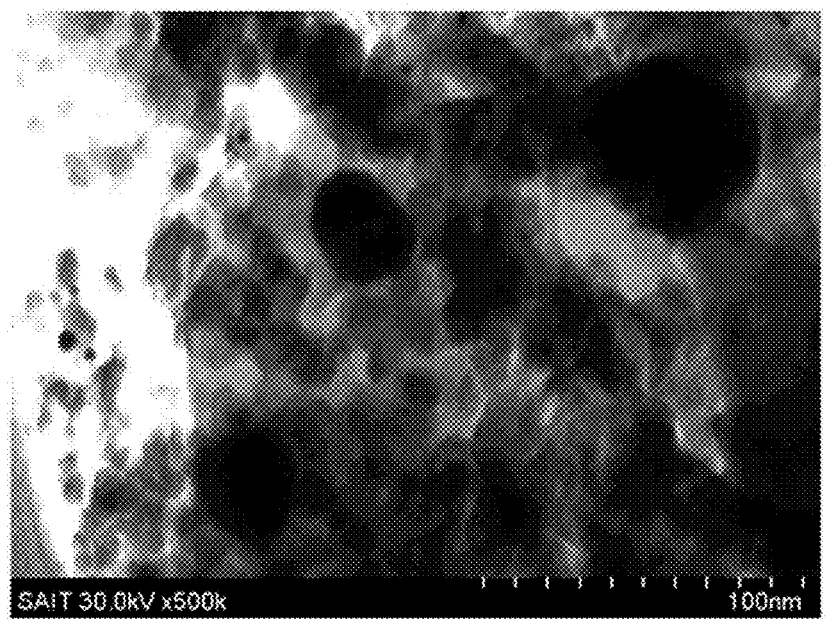

FIG. 8 shows SEM (FIG. 8A) and TEM (FIG. 8B) photographs of the $CO_2$ reforming catalyst according to Example 1 after performing a dry $CO_2$ reforming reaction using the catalyst for 200 hours. From the photographs, it is understood that the catalyst particle size is insignificantly increased before and after the catalyst reaction since the size of the catalyst metal particle is maintained between about 20 and about 30 nm even after participating in the reaction at a relatively high temperature for 200 hours. In addition, it is understood that the shape, the binding structure, or the like of the catalyst metal particle and the protruding portion derived from rod-shaped alumina in the catalyst are not changed, and the relatively strong bond between them is maintained as it was.

Figure 9A:
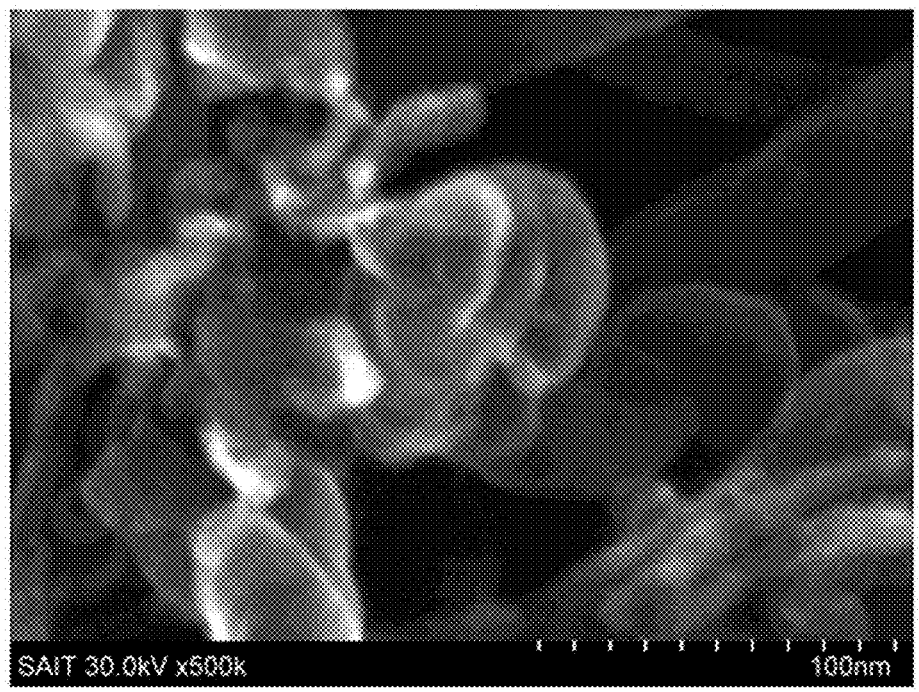
FIG. 9 shows SEM (FIG. 9A) and TEM (FIG. 9B) photographs of the catalyst according to Comparative Example 1 after performing a dry $CO_2$ reforming reaction using the catalyst prepared by the conventional wet method for 200 hours.
Figure 9B:

On the other hand, in the case of Ni—Al catalyst prepared according to the conventional wet process (Comparative Example 1), as shown in FIG. 9, it is understood that whisker-type carbon nanotubes are produced in the catalyst by the carbon deposition after being used in the dry $CO_2$ reforming reaction at a relatively high temperature for 200 hours (FIG. 9A). In addition, as shown in FIG. 9B, it is understood that the catalyst particle has a non-uniform size from about 20 nm to about 100 nm, and also has an amorphous shape.

Figure 10A:
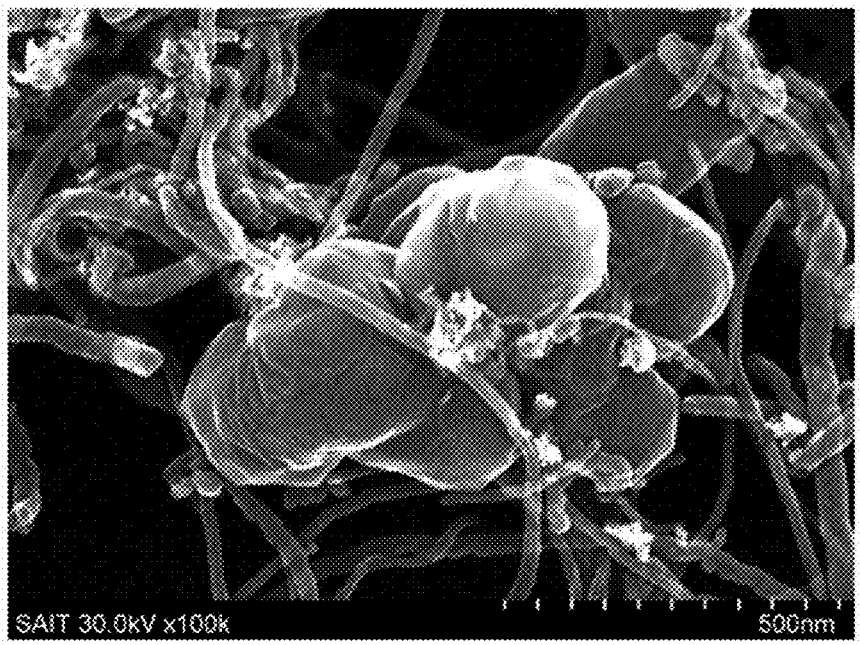
FIG. 10 shows three-dimensional SEM (FIG. 10A) and TEM (FIG. 10B) photographs of the catalyst shown in FIG. 9.
Figure 10B:
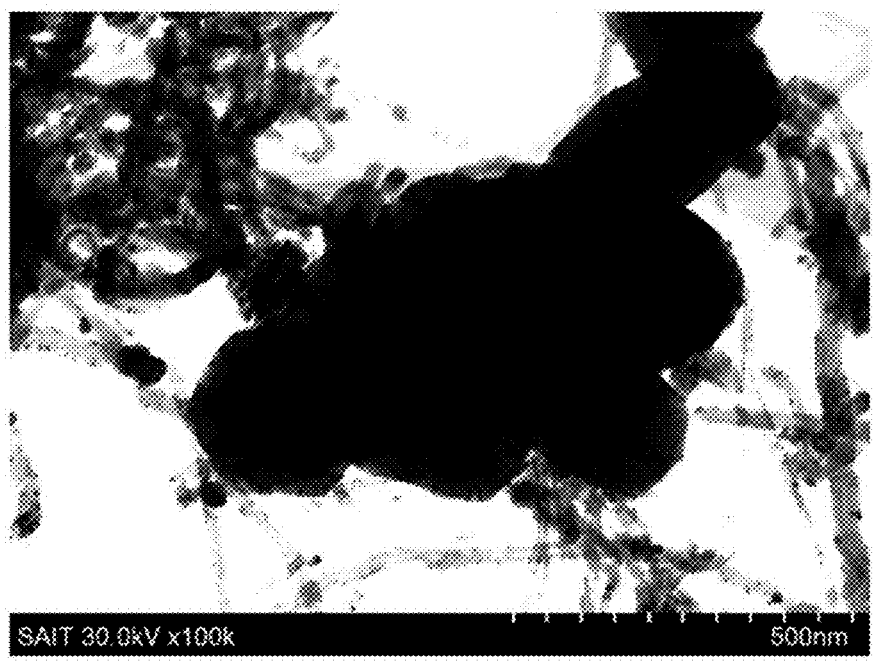

FIG. 10 shows three-dimensional SEM and TEM images of the Ni—Al catalyst prepared by a conventional wet process (Comparative Example 1), and it is understood that carbon nanotubes are formed between the catalyst particles in the catalyst by the carbon deposition after the high temperature dry reaction, as shown in more detail in FIG. 10A. In addition, the catalyst particles are also formed in a relatively large bundle by sintering with each other during the reaction at a relatively high temperature.

On the other hand, the $CO_2$ reforming catalyst according to one example embodiment may also be used for the wet reforming reaction of $CO_2$ represented by the following Reaction Scheme 5.

$3CH_4+CO_2+2H_2O \rightarrow 4CO+8H_2$ [Reaction Scheme 5]

The $CO_2$ reforming reaction performs a reaction by adding water as well as $CH_4$ and $CO_2$, which are the reactants of the reaction for reforming $CO_2$ as understood from the Reaction Scheme. As a result, $H_2$ and CO may be obtained as final products in the molar ratio of $H_2$/CO of 2.

Figure 11:
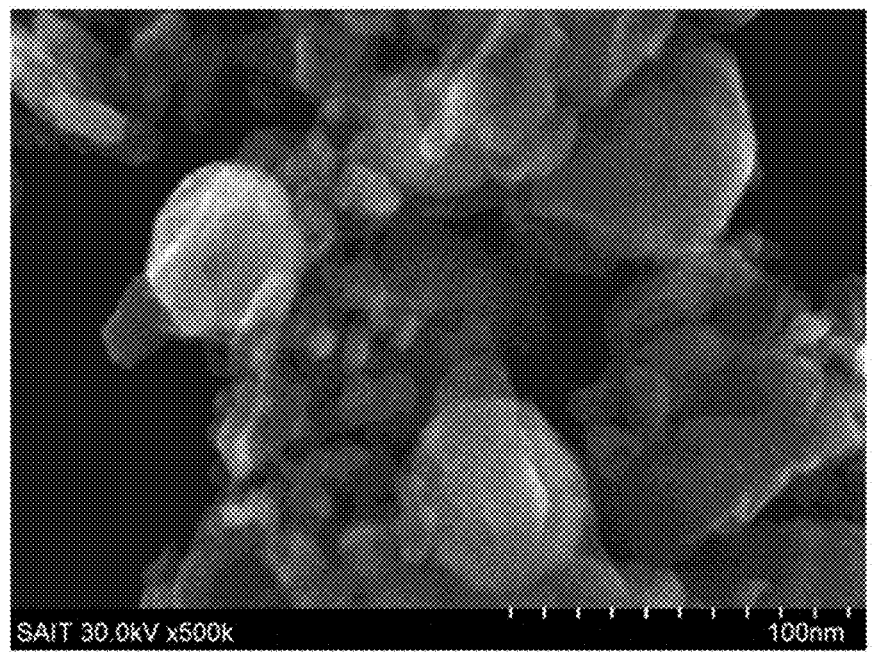
FIG. 11 is a SEM photograph of the catalyst according to Example 1 after performing a wet $CO_2$ reforming reaction using the catalyst at 850° C. for 200 hours.

FIG. 11 shows SEM and TEM image photographs of the NiAl catalyst according to one example embodiment (Example 1) after being used in the $CO_2$ wet reforming reaction at 850° C. for 200 hours. From the drawing, it is understood that, in the catalyst according to Example 1, the Ni particle maintains the hexagonal shape having a size of about 20 nm even after performing the wet reforming reaction at a relatively high temperature for about 200 hours, and the rod-shaped alumina carrier is still present around the Ni particle. In other words, it is understood that a relatively stable bond between the catalyst particle and the carrier is maintained by the relatively high interaction thereof, and is maintained even in the wet reforming reaction at a relatively high temperature.

Figure 12A:
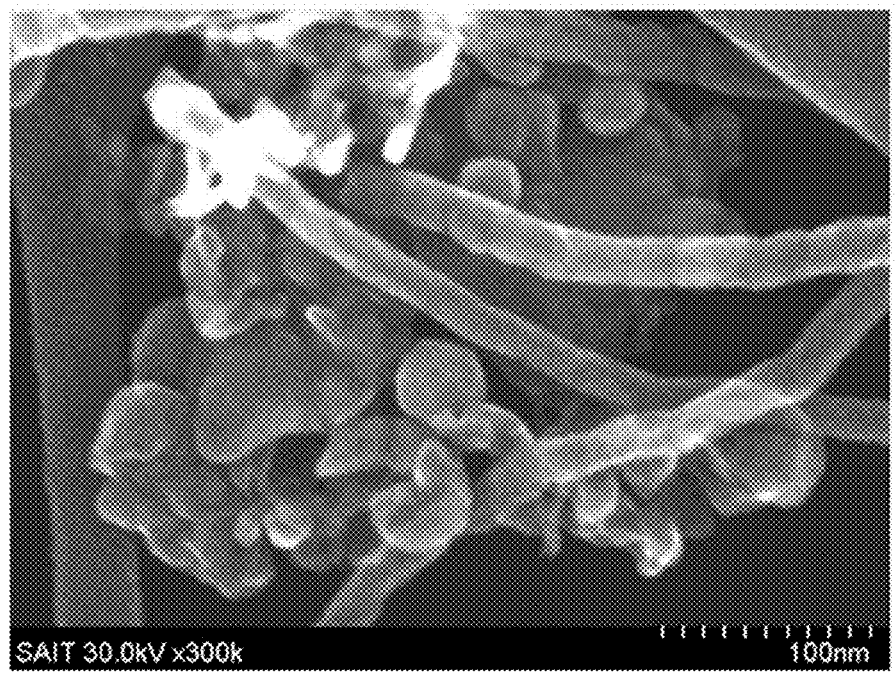
FIG. 12 shows SEM (FIG. 12A) and TEM (FIG. 12B) photographs of the catalyst according to Comparative Example 1 after performing a wet $CO_2$ reforming reaction using the catalyst at 850° C. for 200 hours.

On the other hand, in the catalyst according to Comparative Example 1 prepared by the conventional method, the Ni particle has an amorphous irregular shape and a non-uniform particle size of about 20-100 nm as shown in FIG. 12A. In addition, it is found that coarse carbon nanotubes are formed among the Ni particles.

Figure 12B:
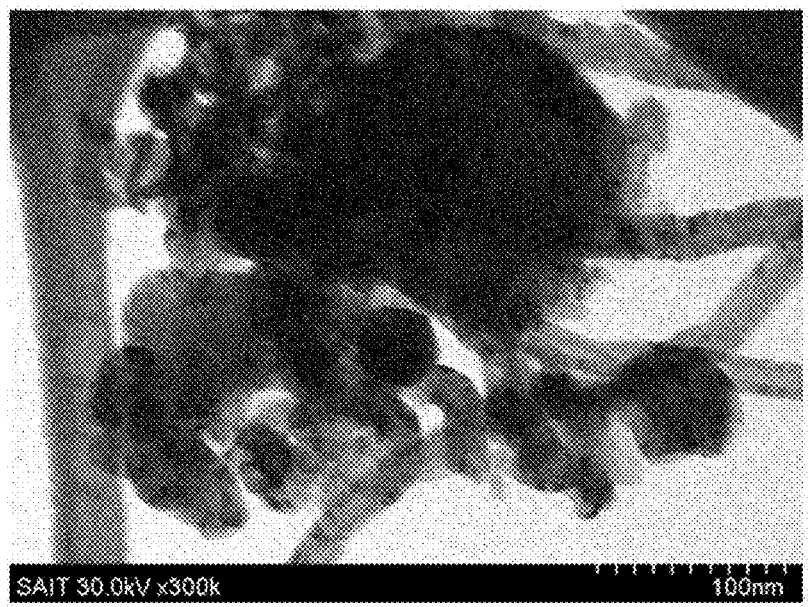
Figure 13A:
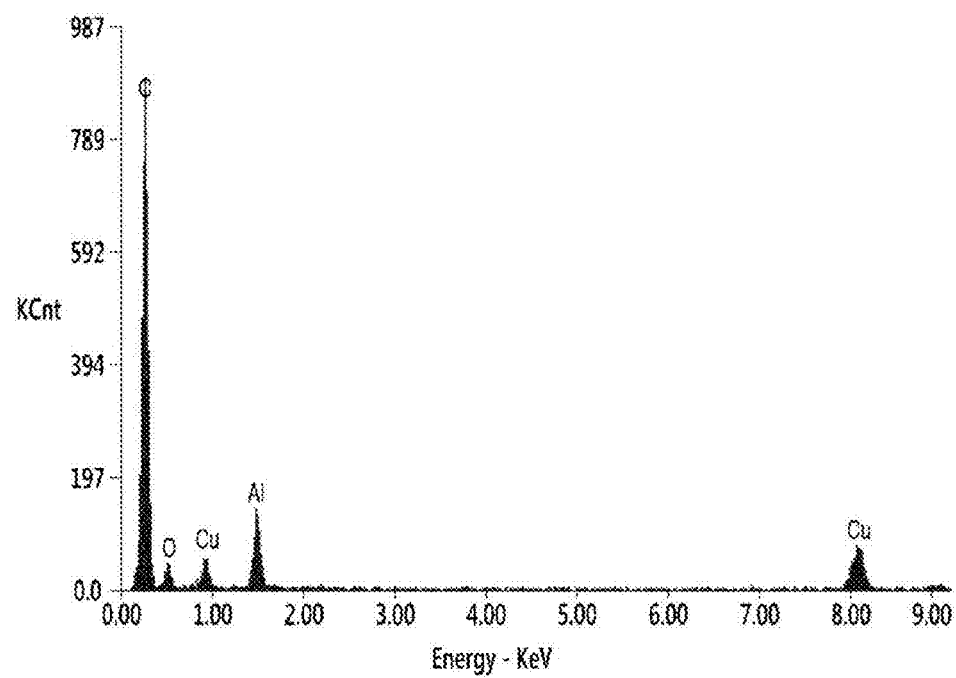
FIG. 13 is a graph showing the results of measuring components of a particle portion (FIG. 13A) and other portions (FIG. 13B) in the catalyst shown in FIG. 12 by EDAX.
Figure 13B:
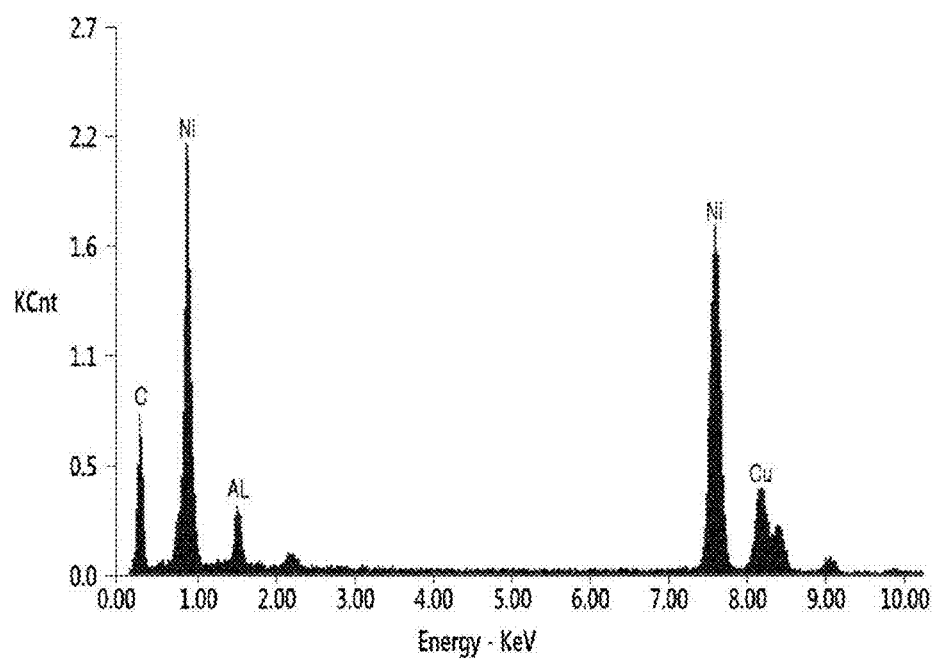

FIG. 13 shows the components of each portion of the catalyst shown in FIG. 12 measured by EDAX. FIG. 13A shows the results of measuring the portion expressed in the circular particle in FIG. 12, and it is understood that the amorphous irregular particles shown in FIG. 12 are Ni catalyst particles since Ni is mostly detected in the portion. In addition, FIG. 13B shows the results of measuring the portions other than the circular particle in FIG. 12, and it is understood that the catalyst is deposited with carbon during the wet reforming reaction at a relatively high temperature since it includes a relatively high amount of carbon.

Figure 14:
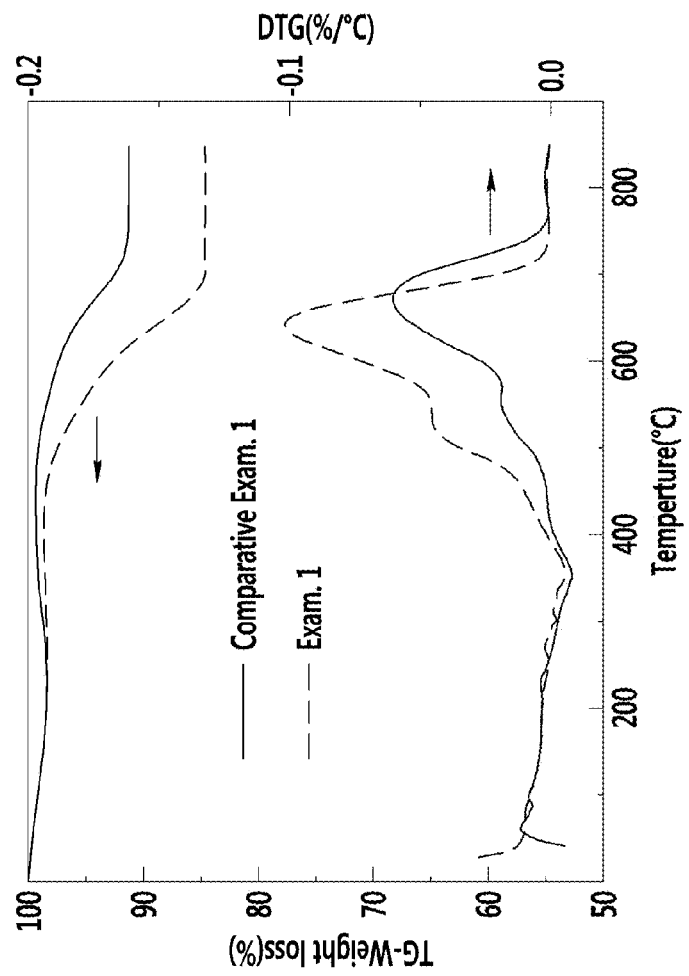
FIG. 14 is a graph showing the results of measuring thermogravimetric analysis (TGA) and derivative thermogravimetry (DTG) of catalysts according to Example 1 and Comparative Example 1 after performing a wet $CO_2$ reforming reaction using the catalysts at 850° C. for 200 hours.

FIG. 14 is a graph showing the results of thermogravimetric analysis (TGA) and derivative thermogravimetric analysis (DTG) of catalysts according to Example 1 and Comparative Example 1 after performing a wet $CO_2$ reforming reaction at a relatively high temperature for 200 hours. From FIG. 14, it is understood that weight is lost in Comparative Example 1 which means that coking has occurred in the catalyst according to Comparative Example 1. On the other hand, weight is lost to a lesser extent in the catalyst according to Example 1, which means that coking is occurring at a lesser extent in the catalyst. The results calculated from the graph show that the carbon deposition amount of the catalyst according to Example 1 is relatively low, at a level of about 40% relative to the catalyst according to Comparative Example 1.

In the $CO_2$ reforming catalyst according to one example embodiment, the catalyst metal may be at least one selected from the group consisting of Ni, Co, Cr, Mn, Mo, Ag, Cu, Zn, and Pd. In a non-limiting embodiment, the catalyst metal particle may be a particle formed entirely of Ni. In another non-limiting embodiment, the catalyst metal particle may be a particle that includes Ni and one or more of the abovementioned metals and/or other metal(s). The catalyst metal of Ni, Co, Cr, Mn, Mo, Ag, Cu, Zn, and Pd has a lower cost compared to a noble metal catalyst metal, and also has a relatively high temperature stability or the like, so it is useful as a $CO_2$ reforming reaction catalyst at a relatively high temperature.

According to one example embodiment, in the $CO_2$ reforming catalyst using Ni as a catalyst metal, the Ni metal may form a particle having a hexagonal surface in the state of being supported in the porous carrier. In other words, differing from the catalyst prepared by the conventional method, the $CO_2$ reforming catalyst according to one example embodiment has a half circular or half oval cross-sectional surface when linearly cut in a direction perpendicular to the binding surface between the catalyst metal particle and the porous carrier, and also each catalyst metal particle may have a hexagonal surface.

The porous carrier may be an oxide. For example, the oxide may be at least one selected from the group consisting of alumina, titania, ceria, and silica oxide.

In the $CO_2$ reforming catalyst, when the carrier is, for example, alumina, silica, or the like, the carrier may maintain the stable γ shape even after participating in a relatively high temperature catalyst reaction due to the relatively rigid carrier characteristic, so to improve the durability and life-span characteristics of the catalyst.

In the $CO_2$ reforming catalyst, a porous carrier having a larger specific surface area is better. For example, the porous carrier may have a specific surface area of about 20 to about 500 $m^2/g$, and specifically about 100 to about 500 $m^2/g$.

As described in the above, the $CO_2$ reforming catalyst according to one example embodiment suppresses the sintering between catalyst particles even after the reforming reaction at a relatively high temperature, and reduces or prevents the carbon deposition to the catalyst particle and the decrease of the size of the carrier pores. Thereby, the specific surface area of the porous carrier is decreased after using the catalyst in the $CO_2$ reforming reaction at 700 to 900° C., and specifically 700 to 850° C., for 10 to 200 hours by only about 5% to about 30% compared to before participating in the reforming reaction.

The $CO_2$ reforming catalyst may affect the degree of activity according to the supported concentration of the catalyst metal. For example, in the $CO_2$ reforming catalyst, the supported concentration of the catalyst metal may range from about 1 to about 20 wt %, and specifically about 4 to about 8 wt %.

In one example embodiment, when the $CO_2$ reforming catalyst is formed by using Ni as a catalyst metal and alumina as a porous carrier in the above weight ratio, the catalyst has Ni in a volume ratio of about 0.4 to about 7.5%, for example, about 0.44% to about 7.32%, and alumina in a volume ratio of about 99.5% to about 92.5%, for example, about 99.56% to about 92.68%, since Ni has a density of about 8.9 and alumina ($Al_2O_3$) has a density of about 4.

The $CO_2$ reforming catalyst decreases the degradation of the catalyst even after the dry and wet $CO_2$ reforming reaction at a relatively high temperature for a relatively long time, so the activity of the catalyst is maintained for a long time, and the catalyst life-span is extended.

Figure 15:
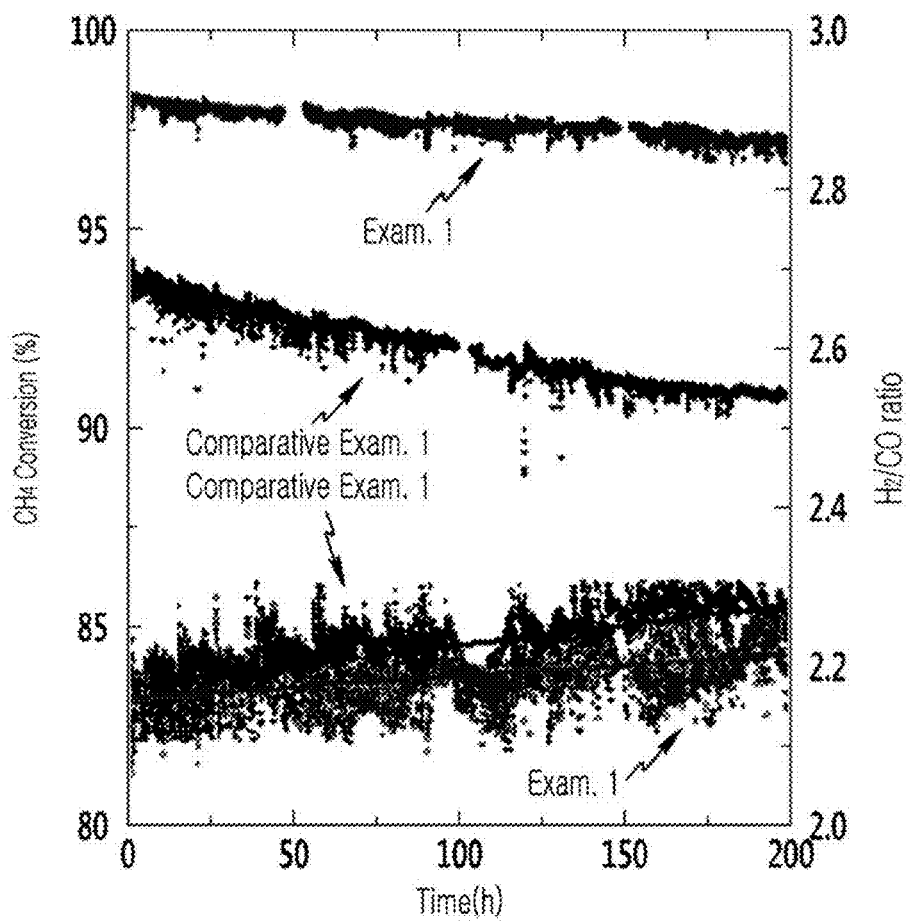
FIG. 15 is a graph showing the $CH_4$ conversion rate change and the $H_2$/CO production ratio change of catalysts according to Example 1 and Comparative Example 1 over time while performing a wet $CO_2$ reforming reaction using the catalysts at 850° C. for 200 hours.

FIG. 15 is a graph showing the $CH_4$ conversion rate and the produced $H_2/CO$ ratio by lapse of time when the catalyst according to Example 1 prepared by the method according to one example embodiment and the catalyst according to Comparative Example 1 prepared by the conventional method participate in the $CO_2$ wet reforming reaction at a relatively high temperature (850° C.) for 200 hours. From the graph, it is understood that the $CH_4$ conversion rate is less decreased by the lapse of time in the case of using the catalyst according to Example 1, but the $CH_4$ conversion rate is relatively more decreased by the lapse of time in the case of using the catalyst according to Comparative Example 1. In addition, the produced $H_2/CO$ ratio relatively maintains the ratio of about 2 even by the lapse of time in the catalyst according to Example 1, but the ratio is increased to over 2 by the lapse of time in the catalyst according to Comparative Example 1. In other words, it is understood that the relatively high temperature wet $CO_2$ reforming reaction for reaching the $H_2/CO$ ratio to about 2 is badly maintained in the case of using the catalyst according to Comparative Example 1. From the results, it is understood that in the catalyst according to one example embodiment, the catalyst activity is maintained even during the reaction at a relatively high temperature for a relatively long time, the life-span of the catalyst is extended, and the durability to the degradation is provided.

On the other hand, the wet catalyst method of reforming $CO_2$ using the $CO_2$ reforming catalyst may provide graphene on the surface of the catalyst metal particle of the $CO_2$ reforming catalyst as a side-product, as well as CO and $H_2$ which are products of reforming $CO_2$ represented by Reaction Scheme 5. The graphene may be formed in 1-5 layers on the surface of the catalyst metal particle during the reaction. The reaction of producing graphene from the reactants $CH_4$ and $CO_2$ may be represented by the following Reaction Scheme 6 and Reaction Scheme 7.

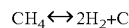
$CH_4 \leftrightarrow 2H_2 + C$           [Reaction Scheme 6]

$2CO \leftrightarrow CO_2 + C$ [Reaction Scheme 7]

Figure 18A:
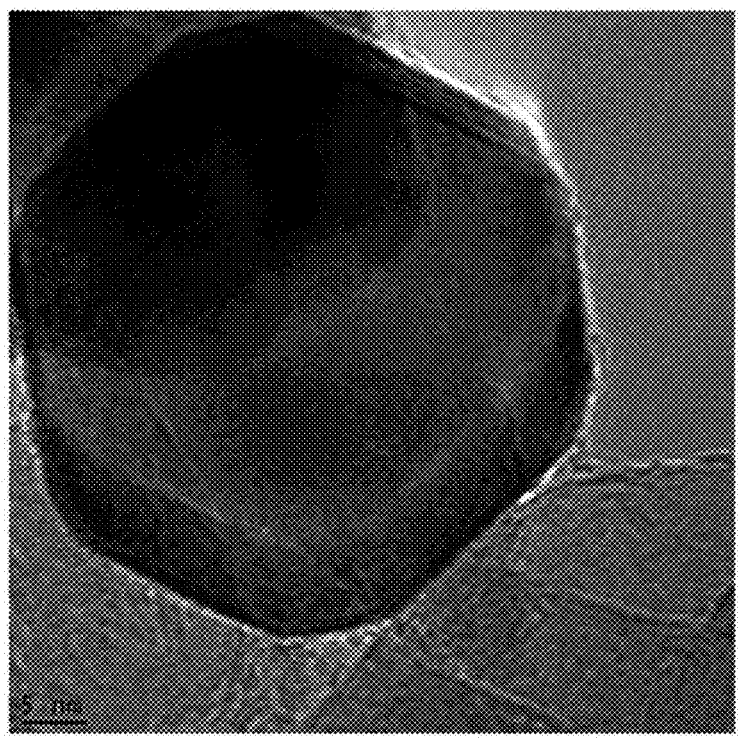
FIG. 18 is a TEM photograph showing Ni particle shape in each catalyst and graphene produced around the Ni particle after performing a wet $CO_2$ reforming reaction using a catalyst according to Example 1 (FIG. 18A) and the catalyst according to Comparative Example 1 (FIG. 18B) at 850° C. for 200 hours.

FIG. 18A is a TEM photograph showing that a thin graphene layer is formed around the Ni particle of the catalyst prepared according to Example 1, after applying the wet reforming reaction. On the other hand, multi-layered graphite is formed around the Ni particle of the catalyst according to Comparative Example 1 when applying the same reaction.

Studies on preparing graphene are actively progressing since the various structural and chemical properties thereof are desirable, but it is not easy to provide graphene at a relatively low price and with a relatively large area. However, the wet catalyst reaction using the $CO_2$ reforming catalyst according to one example embodiment may produce graphene having an industrially-useful application at a relatively low price. On the other hand, the conventional catalyst produces only whisker-type carbon nanotubes as a side-reactant which causes the catalyst degradation by the carbon deposition. In addition, the method of preparing graphene is a reaction simply using a catalyst, which has merits of very simple process conditions compared to the many well known methods of preparing graphene.

According to another example embodiment, a method of preparing the $CO_2$ reforming catalyst is provided. The method includes the following steps:

immersing a porous carrier into a precursor solution of at least one catalyst metal (e.g., selected from the group consisting of Ni, Co, Cr, Mn, Mo, Ag, Cu, Zn, and Pd) and drying the same to provide a catalyst-carrier complex in which the particles of the catalyst metal are supported in the porous carrier;

firing the catalyst-carrier complex at a temperature of less than or equal to 900° C. under the presence of nitrogen ($N_2$) or hydrogen ($H_2$) gas;

purging the fired catalyst-carrier complex with the inert gas and reducing the same;

immersing the reduced catalyst-carrier complex in water; and reducing the water-immersed catalyst-carrier complex with water and hydrogen.

The $CO_2$ reforming catalyst prepared according to the method has a half circular or half oval-shaped cross-sectional surface when linearly cutting in a direction perpendicular to the binding surface of the catalyst metal particle and the porous carrier by binding each catalyst metal particle to the porous carrier in a form of an alloy. The porous carrier includes a protruding portion extended in a rod, needle, or sheet shape around the catalyst metal particle.

In the method, the catalyst-carrier complex may be fired at a temperature of less than or equal to 900° C., specifically, a temperature of about 450 to about 900° C., and more specifically, a temperature of about 500 to about 850° C.

In the method, the purging of the fired catalyst-carrier complex with inert gas may be performed by purging with nitrogen ($N_2$), helium (He), or argon (Ar) gas for about 5 to about 20 minutes, specifically, for about 10 minutes.

In the method, the reducing the catalyst-carrier complex after the purging of the catalyst-carrier complex with inert gas includes heating the same under the hydrogen gas atmosphere at about 500 to about 900° C. for about 1 hour, specifically, at about 850° C. for about 1 hour.

In the method, the immersing the reduced catalyst-carrier complex in water may include adding water to the reduced catalyst-carrier complex. Particularly, the reduced catalyst-carrier complex may be cooled before adding water thereto.

The reducing the water-immersed catalyst-carrier complex with water and hydrogen includes supplying water and hydrogen gas to the catalyst-carrier complex while heating from room temperature until about 800° C. to about 900° C., specifically, until about 850° C.

Hereinafter, various embodiments are illustrated in more detail with reference to several examples. However, the following are merely example embodiments and are not intended to be limiting.

EXAMPLES

Example 1

7 wt % of a Ni/γ-$Al_2O_3$ catalyst is prepared according to an early wet process. Alumina (150 m$^2$/g, alumina granule diameter: ~3 mm φ, Alfa) is immersed in a Ni(NO$_3$)$_2$H$_2$O (Samchun) aqueous solution and dried in an oven at 120° C. for 24 hours and fired at 900° C. under a nitrogen ($N_2$) gas atmosphere for 1 hour. The fired catalyst is purged with He gas at 500° C. for 10 minutes and then maintained at 850° C. under the hydrogen atmosphere for 1 hour to provide 7 wt % of a Ni/γ-$Al_2O_3$ catalyst. A reactor is cooled at 30° C., and 5 ml of distilled water is added to the catalyst. Then the water is evaporated by heating (10° C./minute) under a hydrogen atmosphere and maintained at 850° C. for one hour.

The SEM and TEM images of the prepared catalyst are taken to show the shape of the catalyst metal particle and the shape of the carrier (referring to FIG. 4). The catalysts are examined using the ultra-high-resolution field emission scanning electron microscopy (UHR-FE-SEM; Hitachi S-5500, resolution 0.4 nm) with transmission electron microscopy (TEM) operating at 30 kV. Elemental composition is assessed using an energy dispersive X-ray spectroscopy (EDS) in conjunction with the UHR-FE-SEM. The specimens for EM characterization were prepared by spreading a droplet of ethanol suspension containing the sample onto a copper grid coated with a thin layer of amorphous carbon film and allowing it to dry in air.

FIG. 4A is the SEM image showing that the alumina carrier is formed with a protruding portion extended in a rod shape. FIG. 4B is the TEM image showing that the rod-shaped protruding portion of alumina is formed around the hexagonal Ni catalyst particle, so the catalyst metal particle and the alumina carrier are bound by a relatively strong interaction.

FIG. 5 shows SEM (FIG. 5A) and TEM (FIG. 5B) photographs taken from parts of FIG. 4A and FIG. 4B with differing magnification, so that the shapes of the hexagonal Ni catalyst particle and the rod-shaped alumina are further shown in detail.

Example 2

7 wt % of a Ni/γ-$Al_2O_3$ catalyst is prepared in accordance with the same procedure as in Example 1, except that alumina (150 m$^2$/g, alumina granule diameter: ~3 mm φ, Alfa) is immersed in a Ni(NO$_3$)$_2$H$_2$O (Samchun) aqueous solution and dried in an oven at 120° C. for 24 hours and then fired at 900° C. under the hydrogen ($H_2$) gas atmosphere for 1 hour instead of firing at 900° C. under the nitrogen ($N_2$) gas atmosphere.

Comparative Example 1

7 wt % of a Ni/γ-$Al_2O_3$ catalyst is prepared according to the early wet process. Alumina (150 m$^2$/g, alumina granule diameter: ~3 mm φ, Alfa) is immersed in a Ni(NO$_3$)$_2$H$_2$O (Samchun) aqueous solution and dried in an oven at 120° C. for 24 hours and fired at 500° C. under the air atmosphere for 5 hours. The fired catalyst is reduced under the nitrogen atmosphere while heating (10° C./minute) and maintained at 850° C. under the hydrogen atmosphere for one hour to provide a 7 wt % of Ni/γ-$Al_2O_3$ catalyst.

Figure 7A:
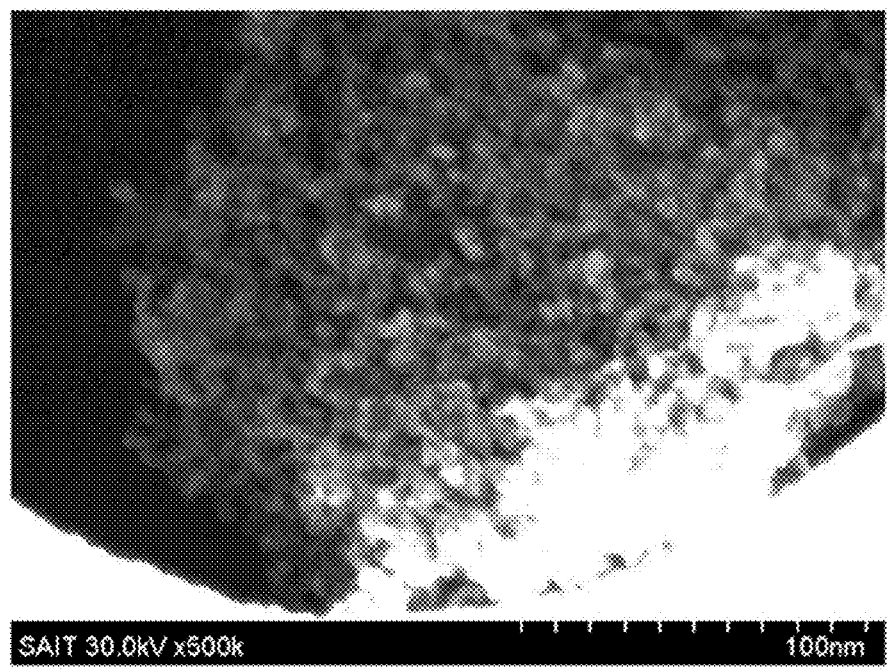
FIG. 7 shows SEM (FIG. 7A) and TEM (FIG. 7B) photographs of the surface of the NiAl catalyst prepared by a conventional wet method.
Figure 7B:
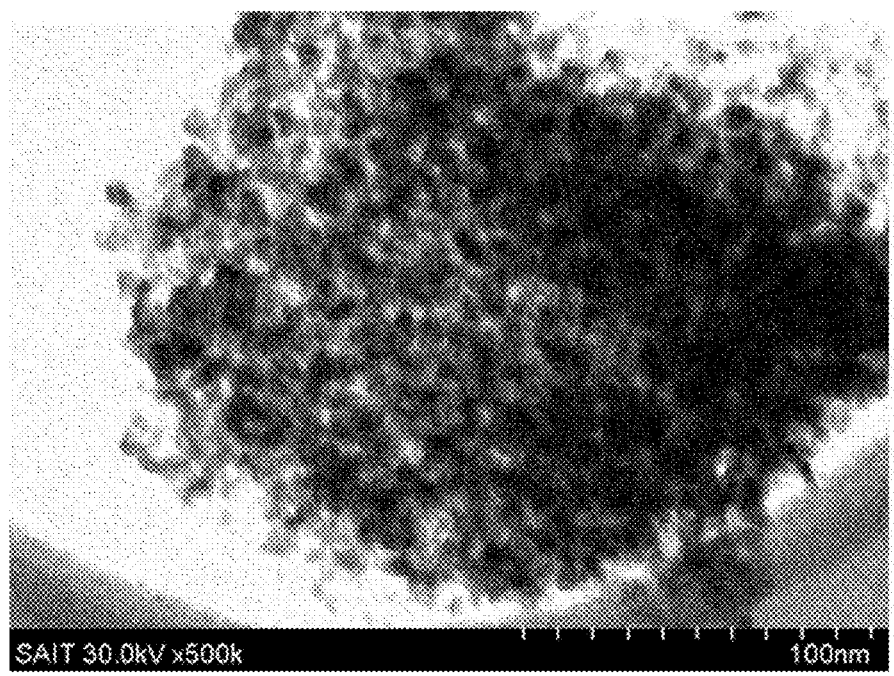

The prepared catalyst is photographed to provide SEM and TEM images (referring to FIG. 7) as in Example 1. FIG. 7A is the SEM image which does not show a rod-shaped bundle of the alumina carrier, differing from FIG. 4A. The TEM image shown in FIG. 7B also does not show the rod-shaped protruding portion of alumina carrier, and the shape of the Ni catalyst particle is amorphous rather than hexagonal as shown in FIG. 4B.

Comparative Example 2

7 wt % of a Ni/γ-$Al_2O_3$ catalyst is prepared in accordance with the same procedure as in Example 1, except that alumina (150 m$^2$/g, alumina granule diameter: ~3 mm φ, Alfa) is immersed in a Ni(NO$_3$)$_2$H$_2$O (Samchun) aqueous solution and dried in an oven at 120° C. for 24 hours and then fired at 500° C. under the air atmosphere for 1 hour instead of firing at 900° C. for 1 hour under the nitrogen ($N_2$) gas atmosphere.

Comparative Example 3

7 wt % of a Ni/γ-$Al_2O_3$ catalyst is prepared in accordance with the same procedure as in Example 1, except that alumina (150 m$^2$/g, alumina granule diameter: ~3 mm φ, Alfa) is immersed in a Ni(NO$_3$)$_2$H$_2$O (Samchun) aqueous solution and dried in an oven at 120° C. for 24 hours and then fired at 900° C. under the air atmosphere for 1 hour instead of firing at 900° C. under the nitrogen ($N_2$) gas atmosphere.

Comparative Example 4

7 wt % of a Ni/γ-$Al_2O_3$ catalyst is prepared in accordance with the same procedure as in Example 1, except that alumina (150 m²/g, alumina granule diameter: ~3 mm φ, Alfa) is immersed in a Ni(NO₃)₂H₂O (Samchun) aqueous solution and dried in an oven at 120° C. for 24 hours and then fired at 1000° C. under the air atmosphere for 1 hour instead of firing at 900° C. under the nitrogen (N₂) gas atmosphere.

Experimental Example 1

The catalyst prepared from Example 1 is analyzed for the components using an EDAX (Energy Dispersive x-ray Spectroscopy) element analyzer. In other words, from the results of measuring the hexagonal particle portion and the rod portion of the catalyst, it is understood that the hexagonal particle portion corresponds to the Ni catalyst particle since it has a high amount of Ni (FIG. 6A), and the rod-shaped protruding portion is derived from the alumina carrier since it has a high amount of Al (FIG. 6B). Thereby, the shape of the catalyst metal particle and the alumina carrier may be confirmed in the catalyst obtained from Example 1.

Experimental Example 2

Using the catalysts prepared from Example 1 and Comparative Example 1, a dry reforming reaction of $CO_2$ and $CH_4$ is performed as in following Reaction Scheme 1 and Reaction Scheme 2. 0.45 g of each catalyst prepared from Example 1 and Comparative Example 1 is added with reactants of $CH_4$ and $CO_2$, nitrogen is flowed in each at 200 sccm (standard cubic centimeter per minute) at 850° C., and the reaction is carried out for 200 hours (gas hourly space velocity (GHSV)=56 k cc/g·hr).

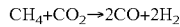   [Reaction Scheme 1]

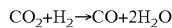   [Reaction Scheme 2]

After the reaction, the catalysts according to Example 1 and Comparative Example 1 are photographed to obtain SEM and TEM images.

From FIGS. 8A and 8B, the catalyst according to Example 1 maintains a hexagonal shape having a size of 20-30 nm even after the reforming reaction at a high temperature for 200 hours, and the rod-shaped alumina carrier is still present around the Ni particle as shown in FIG. 8B, so it is understood that the stable bond between the catalyst particle and the carrier is maintained by the high interaction between them.

On the other hand, in the catalyst according to Comparative Example 1 shown in FIG. 9A, the Ni particle has an irregular shape and a non-uniform size of about 20-100 nm. In addition, the bold line between the Ni particles is found, which is more clearly shown in FIG. 10 showing three-dimensional SEM and TEM photographs. FIG. 10A is a 3D SEM photograph showing that Ni particles are agglomerated with each other and sintered, and that whisker-type long carbon nanotubes are formed between the particles. In other words, in the catalyst according to Comparative Example 1, a coking phenomenon occurs by carbon deposition during the reforming reaction at a high temperature.

Experimental Example 3

Using the catalysts according to Example 1, Example 2, Comparative Example 1, and Comparative Example 2, a wet reforming reaction of $CO_2$ and $CH_4$ is performed according to following Reaction Scheme 5. 0.45 g of each catalyst obtained from Example 1, Example 2, Comparative Example 1, and Comparative Example 2 is added with $CH_4:CO_2:H_2O:N_2$ in a molar ratio of 1:0.4:0.81:1.6 at 850° C. under 1 atm and reacted with the reaction represented by the following Reaction Scheme 5 for 200 hours (gas hourly space velocity (GHSV, $CH_4$ basis)=13,333 ml/g·h), entire gas 50,666 ml/g·h basis).

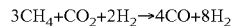   [Reaction Scheme 5]

The catalysts according to Example 1 and Comparative Example 1 are photographed to provide SEM and TEM images after the reaction.

As shown in FIG. 11, in the catalyst according to Example 1, the Ni particle maintains the hexagonal shape having a size of about 20 nm even after the wet reforming reaction at a relatively high temperature for 200 hours, and a rod-shaped alumina carrier is still present around the Ni particle. In other words, the stable bond between the catalyst particle and the carrier is maintained by the high interaction and is also maintained even after a high temperature wet reforming reaction.

On the other hand, in the catalyst according to Comparative Example 1, the Ni particle has an amorphous and irregular shape and a non-uniform particle size of about 20-100 nm as shown in FIG. 12A. In addition, coarse carbon nanotubes are found between the Ni particles.

FIG. 13 shows the results of measuring components of each portion of the catalyst according to Comparative Example 1 shown in FIG. 12 by EDAX. As shown in FIG. 13A, it is understood that the particle shown in the round shape in the photograph of FIG. 12 is a Ni catalyst particle, and from FIG. 13B, it is understood that carbon is highly deposited on the catalyst during the relatively high temperature wet reforming reaction.

FIG. 14 is a graph showing the results of measuring thermogravimetric analysis (TGA) and derivative thermogravimetry (DTG) of catalysts according to Example 1 and Comparative Example 1 after performing a wet reforming reaction according to Experimental Example 3 for 200 hours. In Comparative Example 1, the weight loss means that coking has occurred, but it is confirmed that coking rarely occurs since little weight is lost in Example 1.

In addition, the deposition amount of carbon of the catalysts according to Example 1 and Comparative Example 1 after the relatively high temperature wet reforming reaction for 200 hours is calculated from the TGA and DTG graphs, and the results are shown in the following Table 1.

TABLE 1

|  | Deposition amount of carbon (mg C/g catalyst h) | Reaction time |
| --- | --- | --- |
| Catalyst of Example 1 | 0.45 | 200 hours |
| Catalyst of Comparative Example 1 | 0.87 | 200 hours |

From Table 1 and the graph shown in FIG. 14, it is understood that when the $CO_2$ reforming reaction is performed using the catalyst according to the examples, the deposition amount of carbon is remarkably decreased compared to the catalyst prepared by the conventional method.

FIG. 15 is a graph showing the $CH_4$ conversion rate and the $H_2/CO$ ratio of catalysts by lapse of time while performing the reaction using the catalysts according to Example 1 and Comparative Example 1 in accordance with the procedure of Experimental Example 3. The graph shows that the $CH_4$ conversion rate is insignificantly decreased in the case of using the catalyst according to Example 1, but the $CH_4$ conversion rate is relatively significantly decreased by lapse of time in the case of using the catalyst according to Comparative Example 1. In addition, the $H_2/CO$ ratio is relatively well maintained at about 2 even through lapsing of time in the case of using the catalyst according to Example 1, but the ratio is increased to over 2 in the case of using the catalyst according to Comparative Example 1. In other words, the high temperature wet $CO_2$ reforming reaction is not maintained enough to maintain the $H_2/CO$ ratio at 2 in the case of using the catalyst according to Comparative Example 1. Thereby, it is understood that the catalyst according to Example 1 maintains the catalyst activity at a high temperature for a long reaction time, so as to extend the catalyst life-span and to provide durability against catalyst degradation.

The catalysts prepared from Example 1, Example 2, Comparative Example 1, and Comparative Example 2 undergo the procedure according to Experimental Example 3, and then each catalyst is measured for the $CH_4$ and $CO_2$ conversion rate, the deposition rate of carbon to the catalyst, the Ni particle size change, and the growth rate of Ni particles after 200 hours. The results are shown in following Table 2.

TABLE 2

| Catalyst | Conversion | rate (%) | Reaction time (h) 1 | Reaction time (h) 200 | Deposition rate of carbon (mgC/gcat · h) | Size changes of Ni particle (nm) | Growth rate of Ni particle (%) |
|---|---|---|---|---|---|---|---|
| Example 1 | $CH_4$ | | 98.5 | 97.9 | 0.082 | 10.5 → 12 | 14 |
|  | $CO_2$ | | 82.6 | 82.2 | | | |
| Example 2 | $CH_4$ | | 98.3 | 97.5 | 0.18 | 13 → 15 | 15 |
|  | $CO_2$ | | 82.4 | 82.0 | | | |
| Comparative Example 2 | $CH_4$ | | 98.3 | 97.1 | 0.45 | 17 → 20 | 17 |
|  | $CO_2$ | | 82.4 | 81.2 | | | |
| Comparative Example 1 | $CH_4$ | | 94 | 90.8 | 0.87 | 7 → 22 | 214 |

As shown in Table 2, in the catalysts of Example 1 and Example 2, the $CH_4$ and $CO_2$ conversion rates are very good, the deposition rate of carbon to the catalyst is very slow, the size changes of Ni particles ranges from about 12 nm and about 15 nm, respectively, which is maintained in a very small size, and the growth rate of particles is only about 14% and 15%, respectively, even after the reaction for 200 hours.

On the other hand, in the catalyst according to Comparative Example 2 using a firing gas of air instead of nitrogen or hydrogen gas, the $CO_2$ conversion rate and the $CH_4$ conversion rate are relatively low, and the deposition rate of carbon is somewhat high. In addition, after the reforming reaction at 850° C. for 200 hours, the Ni particle size is a little larger than those of Example 1 and Example 2, and the growth rate of Ni particles is a little higher.

In addition, the catalyst according to Comparative Example 1 prepared by the conventional initial wet process has the relatively lowest $CO_2$ conversion rate and $CH_4$ conversion rate, and the highest deposition rate of carbon. In addition, after use in the reforming reaction at 850° C. for 200 hours, the Ni particle size is increased by even 214% compared to before the reaction, so the Ni-alumina $CO_2$ reforming catalyst prepared by the conventional method is significantly degraded by being used in the $CO_2$ reforming reaction at a high temperature.

On the other hand, even though not shown in the data, the catalyst according to Comparative Example 4 performing the firing reaction at a temperature (about 1000° C.) of greater than 900° C. has a very high carbon deposition ratio, a larger size of Ni particles compared to other comparative examples, and a very low $CO_2$ conversion rate and $CH_4$ conversion rate.

Before and after the reaction according to Experimental Example 3, the catalysts according to Example 1 and Comparative Example 1 are measured for the specific surface area (BET) and average pore diameter, and the changes of BET and average pore diameter are shown in the following Table 3.

The BET surface area and the pore volume of the catalysts were measured by $N_2$ adsorption at −196° C. using a BET instrument (BELsorp, BEL, Japan). Approximately 0.1 g of catalyst was used for each analysis. The degassing temperature was 200° C. to remove the moisture and other adsorbed gases from the catalyst surface.

TABLE 3

| Catalyst | BET changes ($m^2$/g) | Changes of average pore diameter (nm) |
|---|---|---|
| Comparative Example 1 | 130.3 → 46.0 | 10.5 → 3.0 |
| Example 1 | 93.7 → 68.6 | 19.3 → 22.6 |

From Table 3, it is understood that the catalyst according to Example 1 has a smaller specific surface area (BET) compared to the catalyst according to Comparative Example 1 due to the alloy binding shape of the catalyst particle and the carrier, but the catalyst according to Example 1 after the reaction at a high temperature for 200 hours less decreases the specific surface area compared to the catalyst according to Comparative Example 1. In other words, even after the reaction at a high temperature for 200 hours, the sintering and coking of the catalyst are suppressed, so the catalyst may maintain the specific surface area to a higher degree.

In addition, both catalysts according to Example 1 and Comparative Example 1 increase the average pore diameter of the catalyst after the reaction, but the average pore diameter of the case of Comparative Example 1 is more changed compared to that of Example 1. This is because carrier pores having a smaller diameter are clogged by the carbon deposition or the like during the reaction, and resultantly only larger pores remain in a carrier. Thereby, in the case of Comparative Example 1, more carbon is deposited during the reaction compared to the case of Example 1 to clog the small pores more to increase the average pore diameter relative to the catalyst of Example 1.

Figure 16:
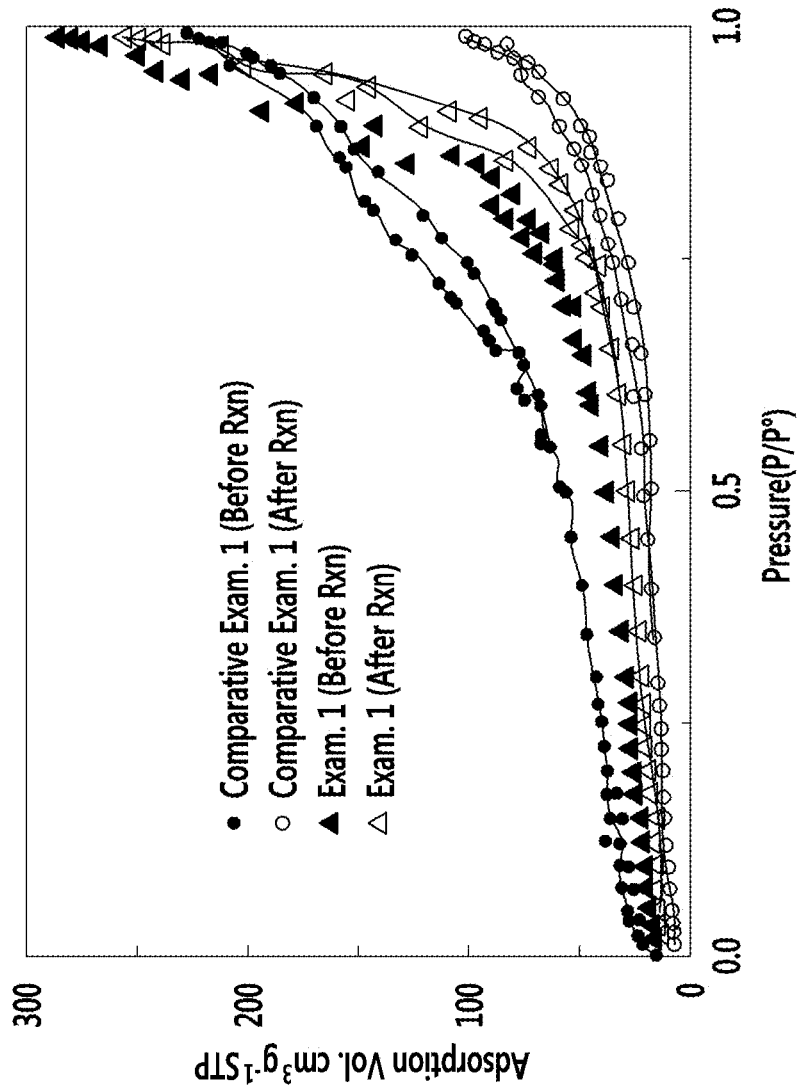
FIG. 16 is a graph showing the volume change of catalysts according to Example 1 and Comparative Example 1 depending upon the increase of pressure after the catalyst reaction at 850° C. for 200 hours.

FIG. 16 is a graph showing the relative volume change of catalysts according to Example 1 and Comparative Example 1 depending upon increasing the relative pressure after the test according to Experimental Example 3. FIG. 16 also illustrates the results of measuring the specific surface area (BET) of the catalyst shown in Table 3. The catalyst according to Example 1 has a little change of the catalyst BET and the average pore diameter of the carrier after the reaction, so the volume is less changed and is steadily maintained according to the change of pressure. On the other hand, the catalyst according to Comparative Example 1 remarkably decreases the BET of catalyst after high temperature reaction and further increases the average pore diameter of carrier, so it is understood that the volume of the catalyst is more significantly decreased according to an increase in the pressure.

Figure 17:
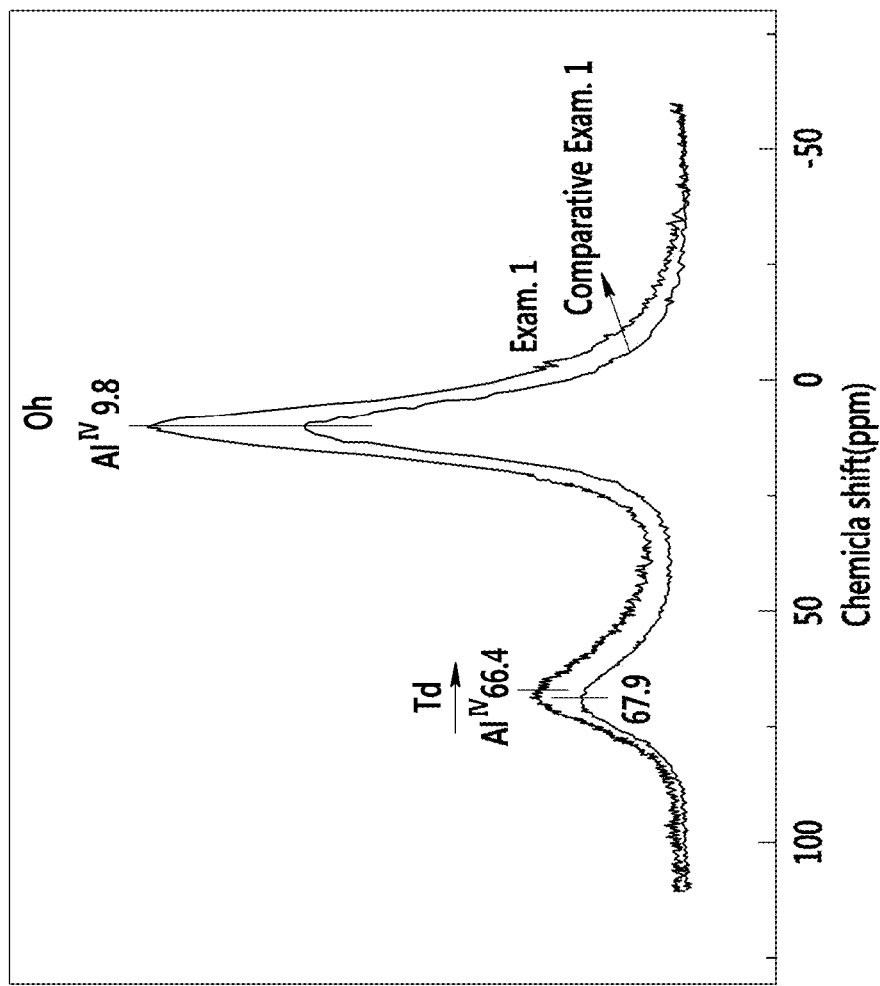
FIG. 17 shows an NMR spectrum of catalysts according to Example 1 and Comparative Example 1 before and after the reaction according to Experimental Example 3.

FIG. 17 shows an NMR (NMR (600 MHz) 2007, AVANCE III 600 Bruker) spectrum of catalysts according to Example 1 and Comparative Example 1 before and after the reaction according to Experimental Example 3.

From the NMR spectrum, it is estimated that the catalyst according to Example 1 has less Lewis acid causing the carbon deposition since the NMR Td peak is high.

The $^{27}$Al NMR peak region rate of Comparative Example 1 and Example 1 before and after the reaction according to Experimental Example 3 is shown in the following Table 4.

TABLE 4

| Catalyst | | $^{27}$Al NMR peak region rate $(Al_{Td}/Al_{Oh})$ |
|---|---|---|
| Comparative Example 1 | Before reaction | 0.37 |
| | After reaction | 0.27 |
| Example 1 | Before reaction | 0.38 |
| | After reaction | 0.33 |

As illustrated in Table 4, it is confirmed that the catalyst according to Example 1 has a $^{27}$Al NMR peak region rate $(Al_{Td}/Al_{Oh})$ of greater than or equal to 0.30 even after the reaction at a relatively high temperature for a relatively long time, and it generally ranges from about 0.30 to about 0.45, even though not shown in the data.

Figure 18B:
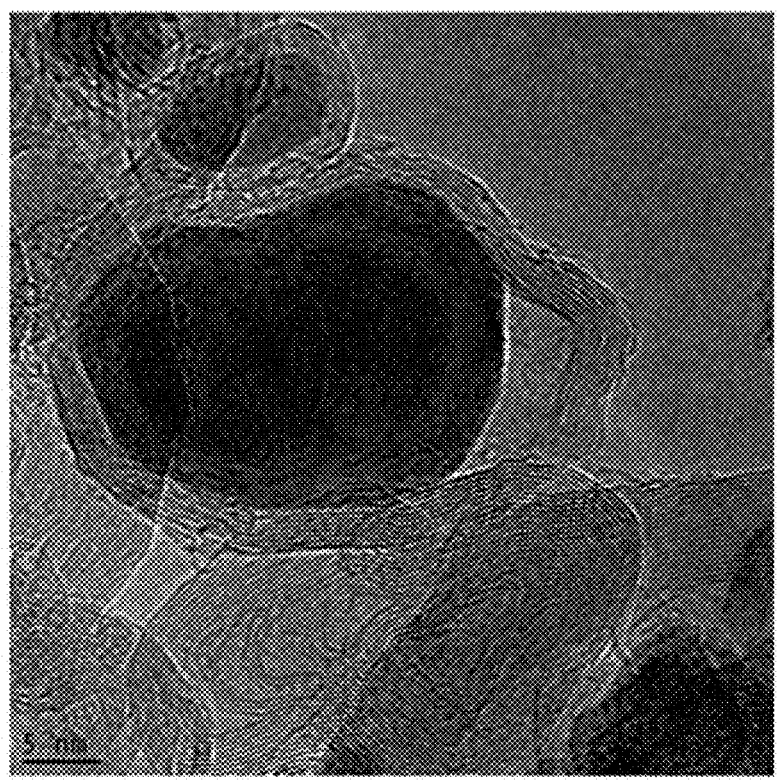

FIG. 18 is a TEM image of the Ni particle after performing a $CO_2$ reforming reaction of Experimental Example 3 using the catalysts according to Example 1 and Comparative Example 1. FIG. 18A shows the Ni particle in the catalyst according to Example 1. As shown in the drawing, it is understood that the Ni particle has a hexagonal shape and is formed with a thin belt around the same which is a graphene layer. In other words, the catalyst according to Example 1 forms 1-5 layered graphene as a side-reaction product on the surface of the catalyst particle during the $CO_2$ wet reforming reaction at a high temperature. FIG. 18B shows the results of measuring the catalyst according to Comparative Example 1, and it is understood that the catalyst particle according to Comparative Example 1 has an amorphous shape, and a multilayered graphene layer is formed around the same. That is, it is confirmed that 1-5 layered graphene is formed around the catalyst particle according to Example 1, while on the other hand, a carbon layer of nearly graphite rather than substantially graphene is formed around the catalyst particle according to Comparative Example 1.

While example embodiments have been disclosed herein, it should be understood that other variations may be possible. Such variations are not to be regarded as a departure from the spirit and scope of example embodiments of the present application, and all such modifications as would be apparent to one skilled in the art after reviewing the disclosure are intended to be included within the scope of the following claims.

What is claimed is:

1. A method of preparing a $CO_2$ reforming catalyst, comprising:
   immersing a porous carrier in a precursor solution of at least one catalyst metal to obtain an immersed carrier, the at least one catalyst metal including a transition metal;
   drying the immersed carrier to obtain a catalyst-carrier complex in which at least one catalyst metal particle is supported on the porous carrier;
   firing the catalyst-carrier complex under a presence of nitrogen ($N_2$) or hydrogen ($H_2$) gas to obtain a fired complex;
   purging the fired complex with inert gas to obtain a purged complex;
   reducing the purged complex to obtain a reduced complex;
   immersing the reduced complex in water to obtain a water-immersed complex; and
   reducing the water-immersed complex to obtain the $CO_2$ reforming catalyst.

2. The method of claim 1, wherein the transition metal is selected from a Group 6-12 element.

3. The method of claim 2, wherein the Group 6-12 element is selected from at least one of Ni, Co, Cr, Mn, Mo, Ag, Cu, Zn, and Pd.

4. The method of claim 1, wherein the obtained $CO_2$ reforming catalyst includes at least one catalyst metal particle having a half circular-shaped or half oval-shaped cross-sectional surface when linearly cut in a direction perpendicular to a binding surface of the at least one catalyst metal particle and the porous carrier, the at least one catalyst metal particle being chemically bound to the porous carrier, and the porous carrier includes protruding portions extending in a rod, needle, or sheet shape around the at least one catalyst metal particle.

5. The method of claim 1, wherein the firing the catalyst-carrier complex is performed at a temperature of about 450° C. to about 900° C. under a presence of nitrogen ($N_2$) or hydrogen ($H_2$) gas.

6. The method of claim 1, wherein the reducing the purged complex includes heating the purged complex at about 500° C. to about 900° C. under a hydrogen gas atmosphere.

7. The method of claim 1, wherein the reducing the water-immersed complex is performed at a temperature of about 800° C. to about 900° C. under a presence of hydrogen and water vapor.

* * * * *